US008288463B2

(12) United States Patent
Urakami et al.

(10) Patent No.: US 8,288,463 B2
(45) Date of Patent: Oct. 16, 2012

(54) POLYLACTIC ACID BASED RESIN, POLYLACTIC ACID BASED RESIN COMPOSITION, MOLDED BODY OF POLYLACTIC ACID BASED RESIN OR POLYLACTIC ACID BASED RESIN COMPOSITION, AND METHOD FOR PRODUCING POLYLACTIC ACID BASED RESIN

(75) Inventors: Tatsuhiro Urakami, Ichihara (JP); Chojiro Higuchi, Chigasaki (JP); Motoaki Isokawa, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 12/735,922

(22) PCT Filed: Feb. 27, 2009

(86) PCT No.: PCT/JP2009/053667
§ 371 (c)(1),
(2), (4) Date: Aug. 26, 2010

(87) PCT Pub. No.: WO2009/107772
PCT Pub. Date: Sep. 3, 2009

(65) Prior Publication Data
US 2010/0331464 A1   Dec. 30, 2010

(30) Foreign Application Priority Data
Feb. 27, 2008   (JP) .................................. 2008-046481

(51) Int. Cl.
C08K 5/20 (2006.01)
C08G 63/08 (2006.01)
C08G 69/26 (2006.01)
C08L 67/00 (2006.01)

(52) U.S. Cl. ........ 524/223; 524/210; 524/221; 528/345; 528/354; 525/419

(58) Field of Classification Search .................. 524/223, 524/210, 221; 528/354, 345; 525/419
See application file for complete search history.

(56) References Cited

U.S. PATENT DOCUMENTS

| 6,417,294 | B1 | 7/2002 | Obuchi et al. |
| 6,861,503 | B2* | 3/2005 | Shalaby ........................ 528/425 |
| 7,109,284 | B2 | 9/2006 | Ishii et al. |
| 7,160,949 | B2 | 1/2007 | Ota et al. |
| 2002/0002252 | A1 | 1/2002 | Obuchi et al. |
| 2005/0001349 | A1* | 1/2005 | Yosimura et al. ............. 264/211 |
| 2005/0001358 | A1 | 1/2005 | Nakazawa et al. |
| 2007/0154431 | A1 | 7/2007 | Nagai et al. |
| 2007/0160861 | A1 | 7/2007 | Shinoda et al. |

FOREIGN PATENT DOCUMENTS

| JP | 03-157422 A | 7/1991 |
| JP | 07-102045 A | 4/1995 |
| JP | 09-278991 A | 10/1997 |
| JP | 2001-122955 A | 5/2001 |
| JP | 2001-270924 A | 10/2001 |
| JP | 2003-073412 A | 3/2003 |
| JP | 2003-192884 A | 7/2003 |
| JP | 2004-285121 A | 10/2004 |
| JP | 2004-359828 | * 12/2004 |
| JP | 2005-281424 A | 10/2005 |
| JP | 2006-131870 A | 5/2006 |
| JP | 2007-177039 A | 7/2007 |
| WO | WO-2005/078017 A1 | 8/2005 |

OTHER PUBLICATIONS

Machine translation of JP 2004-359828. Dec. 2004.*
International Search Report in PCT/JP2009/053667 dated May 26, 2009.

* cited by examiner

Primary Examiner — Ling Choi
Assistant Examiner — John Uselding
(74) Attorney, Agent, or Firm — Foley & Lardner LLP

(57) ABSTRACT

It is an object of the present invention to provide a resin composition having improved heat resistance (high crystallinity) and transparency without impairing rigidity intrinsic to a polylactic acid based resin, a molded body formed from the resin composition, and a new polylactic acid based resin used in the resin composition. A polylactic acid based resin (A) according to the present invention is characterized by having a specific structural moiety and a weight average molecular weight (Mw) of 5,000 to 1,000,000. A polylactic acid based resin composition according to the present invention is characterized by containing the above-described polylactic acid based resin (A).

18 Claims, No Drawings

POLYLACTIC ACID BASED RESIN, POLYLACTIC ACID BASED RESIN COMPOSITION, MOLDED BODY OF POLYLACTIC ACID BASED RESIN OR POLYLACTIC ACID BASED RESIN COMPOSITION, AND METHOD FOR PRODUCING POLYLACTIC ACID BASED RESIN

TECHNICAL FIELD

The present invention relates to a new polylactic acid based resin, a new polylactic acid based resin composition, a molded body of the polylactic acid based resin or the polylactic acid based resin composition, and a method for producing a polylactic acid based resin. Furthermore, the present invention relates to a polylactic acid based resin, a polylactic acid based resin composition, a molded body of the polylactic acid based resin or the polylactic acid based resin composition, wherein the transparency, the crystallization rate, and the heat resistance are improved.

BACKGROUND ART

The awareness about global environmental problems has been raised and, among them, exhaustion of fossil raw materials and petroleum resources and increases in carbon dioxide have been perceived as problems. Consequently, research and development on biodegradable resins, e.g., aliphatic polyesters, and resins synthesized from plants serving as raw materials have been conducted actively. Among the aliphatic polyesters, in particular, a polylactic acid having excellent moldability is noted as a plant-derived resin formed by using lactic acid, which is produced from grain resources, e.g., corn, through fermentation, as a raw material.

However, polylactic acid has drawbacks of being rigid and brittle and, in addition, the crystallization rate is small and the heat resistance is low. Therefore, there is a limitation on development of uses. In particular, as for a polylactic acid amorphous molded body, the softening point is lower than 60° C. and, thereby, such a problem has been pointed out that whitening, deformation, and the like occur easily under a usual use environment.

Furthermore, if an improvement of the heat resistance of the polylactic acid by increasing the crystallinity through a heat treatment (anneal) is intended, there is usually a problem in that crystals (for example, spherulite) having sizes nearly equal to or larger than a wavelength of light and causing scattering of light grow rapidly, so as to become opaque.

In order to solve the above-described problems, many attempts to improve the heat resistance and the transparency by adding various additives to the polylactic acid have been made.

Patent Document 1 describes that addition of phosphoric acid ester metal salts, hydrous magnesium silicate, and the like serving as nucleators is effective. However, in the case where such a nucleator is used, there is a drawback that the transparency is impaired. Moreover, generally used talc is within the range of practical use from the viewpoint of merely the crystallization rate. However, for that purpose, in many cases, it is required that the amount of addition is 1% or more. Consequently, there is a drawback that the transparency, which is a characteristic intrinsic to the polylactic acid, is impaired.

Patent Document 2 describes a method, in which as for the nucleator, at least one type selected from aliphatic carboxylic acid amides, aliphatic carboxylic acid salts, aliphatic alcohols, and aliphatic carboxylic acid esters is added as a transparent nucleator. However, in this case, the haze is 6.5% at a crystallinity of 33% and a result exhibiting combination of sufficient crystallinity and transparency has not been obtained.

Patent Document 3 describes a method, in which a polylactic acid formed by using a compound having a specific functional group as an initiator and an inorganic filler are used. Although sliding characteristics are improved by this method, it is not possible to ensure the transparency because the inorganic filler is added.

On the other hand, Patent Document 4 describes block copolymers of polyolefins, e.g., polyethylene and polypropylene, and polylactic acids. However, there is no description on the transparency. In particular, the transparency at a high crystallinity is not touched on. Furthermore, the olefin based block copolymers used in Patent Document 4 is not easily industrially produced because complicated and high level reactions are used, and the use as general-purpose polymers is unfavorable from the viewpoint of the cost.

Patent Document 5 describes an aliphatic polyester block copolymer having a polyolefin segment and an aliphatic polyester segment. However, the block copolymer is produced by the method in Patent Document 4 described above and, therefore, as in the case of the olefin based block copolymers in Patent Document 4, it is not said that there is a cost advantage.

In addition, Patent Document 5 describes a method, in which a compound having a hydroxyl group and an unsaturated bond, e.g., 2-hydroxyethyl methacrylate (HEMA), is radically reacted with a polypropylene so as to obtain a copolymer, in which HEMA and oligomers thereof are grafted on a polypropylene chain, and thereafter, a polylactic acid segment is introduced through the use of the hydroxyl group. However, it is generally known that in the case where this method is applied to a polyethylene, radical reactions occur at various places of the ethylene chain and, thereby, cross-linking reaction between polyethylene chains occurs at the same time and gelation occurs easily.

Furthermore, in any case, it is usually unavoidable that homopolymers of a grafting agent are generated through side reactions.

Patent Document 1: Japanese Unexamined Patent Application Publication No. 2003-192884
Patent Document 2: Japanese Unexamined Patent Application Publication No. 9-278991
Patent Document 3: Japanese Unexamined Patent Application Publication No. 2004-285121
Patent Document 4: Japanese Unexamined Patent Application Publication No. 2001-270924
Patent Document 5: Japanese Unexamined Patent Application Publication No. 2007-177039

DISCLOSURE OF INVENTION

Problems to be Solved by the Invention

It is an object of the present invention to provide a new polylactic acid based resin. Furthermore, it is an object to provide a resin composition having improved heat resistance (high crystallinity) and transparency without impairing rigidity intrinsic to a polylactic acid based resin and a molded body formed from the resin composition.

Means for Solving the Problems

In order to solve the above-described problems, the present inventors conducted intensive research. As a result, a polylactic acid based resin having a specific moiety was found, and it was found that the above-described problems were able to be solved by a polylactic acid based resin composition including the polylactic acid based resin.

That is, a polylactic acid based resin (A) according to the present invention is characterized by having a moiety represented by the following formula (1) or (1') and having a weight average molecular weight (Mw) of 5,000 to 1,000,000.

[Chemical formula 1]

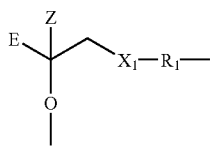
(1)

(In the formula (1), E represents a polymer residue, which is formed from an ethylene homopolymer, a copolymer of ethylene and an α-olefin having the carbon number of 3 to 20, or a homopolymer of an α-olefin having the carbon number of 3 to 20 and which has a weight average molecular weight (Mw) of 400 to 20,000, Z represents a H atom, an alkyl group, or an aralkyl group, $X_1$ represents an O atom or a S atom, and $R_1$ represents a single bond or a group represented by the following formula (2).)

[Chemical formula 2]

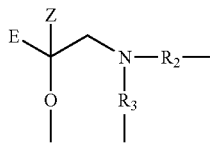
(1')

(In the formula (1'), E represents a polymer residue, which is formed from an ethylene homopolymer, a copolymer of ethylene and an α-olefin having the carbon number of 3 to 20, or a homopolymer of an α-olefin having the carbon number of 3 to 20 and which has a weight average molecular weight (Mw) of 400 to 20,000, Z represents a H atom, an alkyl group, or an aralkyl group, and $R_2$ and $R_3$ represent independently a single bond or a group represented by the following formula (2).)

$$—R_4—X_2—$$ (2)

(In the formula (2), $R_4$ represents a divalent hydrocarbon group or a polyoxyalkylene group and $X_2$ represents an O atom, a S atom, or an NH group.)

Furthermore, it is preferable that a moiety other than the moiety represented by the above-described formula (1) or (1') is formed through repetition of a lactic acid unit.

It is preferable that in the above-described formula (1), E represents a polymer residue, which is formed from an ethylene homopolymer or a copolymer of ethylene and an α-olefin having the carbon number of 3 to 10 and which has a weight average molecular weight (Mw) of 400 to 20,000, Z represents a H atom, $X_1$ represents an O atom, and $R_1$ represents a single bond or an oxyalkylene group having the carbon number of 1 to 6.

In this connection, it is preferable that in the above-described formula (1'), E represents a polymer residue, which is formed from an ethylene homopolymer or a copolymer of ethylene and an α-olefin having the carbon number of 3 to 10 and which has a weight average molecular weight (Mw) of 400 to 20,000, Z represents a H atom, and $R_2$ and $R_3$ represent a single bond or an oxyalkylene group having the carbon number of 1 to 6.

Furthermore, a polylactic acid based resin composition according to the present invention is characterized by containing 5 to 95 percent by weight of polylactic acid based resin (A) described above.

Moreover, it is preferable that a polylactic acid based resin composition according to the present invention contains 5 to 95 parts by weight of polylactic acid based resin (A) described above and 95 to 5 parts by weight of polylactic acid based resin (B) other than the above-described polylactic acid based resin (A) (where a total of the polylactic acid based resins (A) and (B) is assumed to be 100 parts by weight). In addition, it is preferable that the above-described polylactic acid based resin (B) is a polylactic acid.

It is preferable that the above-described polylactic acid based resin (B) has a moiety represented by the following general formula (3)

(3)

(In the formula (3), $X_3$ and $X_4$ represent independently an O atom, a S atom, or an NH group, $R_5$ represents a divalent hydrocarbon group containing at least one aromatic ring or aliphatic ring, and the hydrocarbon group may contain an O atom, a N atom, or a S atom.)

and the weight average molecular weight (Mw) of the above-described polylactic acid based resin (B) is within the range of 5,000 to 1,000,000.

Alternatively, it is preferable that the above-described polylactic acid based resin (B) has a moiety represented by the following general formula (4)

(4)

(In the formula (4), $X_3$ and $X_4$ represent independently an O atom, a S atom, or an NH group, $R_6$ represents a divalent aliphatic hydrocarbon group containing no ring structure and having a weight average molecular weight (Mw) of 25 to 50,000, and the hydrocarbon group may contain an O atom, a N atom, or a S atom.)

and the weight average molecular weight (Mw) of the above-described polylactic acid based resin (B) is within the range of 5,000 to 1,000,000.

Alternatively, it is preferable that the polylactic acid based resin (B) has a moiety which is formed from a repetition unit represented by the following general formula (5)

[Chemical formula 3]

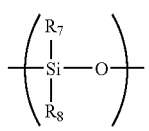
(5)

(In the formula (5), $R_7$ and $R_8$ represent independently a linear or branched alkyl group having the carbon number of 1 to 5 or an aryl group having the carbon number of 6 to 10 and may be the same or different.)

and which has a weight average molecular weight (Mw) within the range of 100 to 10,000, and the weight average molecular weight (Mw) of the polylactic acid based resin (B) is within the range of 5,000 to 1,000,000.

In a polylactic acid based resin composition according to the present invention, 0.1 to 10 parts by weight of at least one type of transparent nucleator (C) selected from carboxylic acid amides, aliphatic alcohols, and aliphatic carboxylic acid esters is further contained relative to 100 parts by weight of polylactic acid based resin (A) described above or 100 parts by weight of the above-described polylactic acid based resins (A) and the above-described other polylactic acid based resin (B) used as necessary in total.

Furthermore, it is preferable that the above-described transparent nucleator (C) is at least one type of carboxylic acid amide selected from the group consisting of lauric acid amide, palmitic acid amide, stearic acid amide, erucic acid amide, behenic acid amide, ricinoleic acid amide, hydroxystearic acid amide, N-oleylpalmitic acid amide, N-stearylerucic acid amide, ethylenebiscapric acid amide, ethylenebislauric acid amide, ethylenebisstearic acid amide, ethylenebisoleic acid amide, ethylenebis-1,2-hydroxystearic acid amide, hexamethylenebiscapric acid amide, hexamethylenebislauric acid amide, hexamethylenebisstearic acid amide, hexamethylenebisoleic acid amide, hexamethylenebis-1,2-hydroxystearic acid amide, m-xylylenebiscapric acid amide, m-xylylenebislauric acid amide, m-xylylenebisstearic acid amide, m-xylylenebisoleic acid amide, and m-xylylenebis-1,2-hydroxystearic acid amide.

A molded body according to the present invention is characterized by being formed from the above-described polylactic acid based resin (A) or the above-described polylactic acid based resin composition and having a haze of 0.1% to 15% at a thickness of 100 μm and a crystallinity of 35% or more after anneal (heat treatment) at 105° C. for 60 seconds.

It is preferable that a method for producing the polylactic acid based resin (A) according to the present invention has the step of copolymerizing a polymer represented by the following formula (I) or (II) and lactide and/or lactic acid.

[Chemical formula 4]

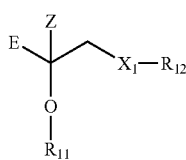

(I)

(In the formula (I), E represents a polymer residue, which is formed from an ethylene homopolymer, a copolymer of ethylene and an α-olefin having the carbon number of 3 to 20, or a homopolymer of an α-olefin having the carbon number of 3 to 20 and which has a weight average molecular weight (Mw) of 400 to 20,000, Z represents a H atom, an alkyl group, or an aralkyl group, $X_1$ represents an O atom or a S atom, and $R_{11}$ and $R_{12}$ represent independently a H atom, a hydroxyalkyl group having the carbon number of 1 to 10, or a hydroxypolyoxyalkylene group having a weight average molecular weight (relative to standard polystyrene) of 200 to 6,000.)

[Chemical formula 5]

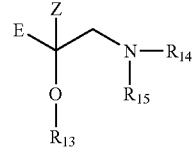

(II)

(In the formula (II), E represents a polymer residue, which is formed from an ethylene homopolymer, a copolymer of ethylene and an α-olefin having the carbon number of 3 to 20, or a homopolymer of an α-olefin having the carbon number of 3 to 20 and which has a weight average molecular weight (Mw) of 400 to 20,000, Z represents a H atom, an alkyl group, or an aralkyl group, and $R_{13}$ to $R_{15}$ represent independently a H atom, a hydroxyalkyl group having the carbon number of 1 to 10, or a hydroxypolyoxyalkylene group having a weight average molecular weight (relative to standard polystyrene) of 200 to 6,000.)

Advantages

According to the present invention, a resin composition having improved heat resistance (high crystallinity) and transparency and a molded body formed from the resin composition are obtained, shortening of a molding cycle, which has been hitherto difficult, and application to products required to have the heat resistance and the transparency become possible, and it is possible to contribute to expansion of uses of green plastic typified by the polylactic acid based resins.

BEST MODES FOR CARRYING OUT THE INVENTION

A polylactic acid based resin according to the present invention, a molded body formed from the polylactic acid based resin, a polylactic acid based resin composition, a molded body formed from the polylactic acid based resin composition, and a method for producing a polylactic acid based resin will be described below in detail. Initially, individual components usable for the polylactic acid based resin composition according to the present invention will be described.

<Polylactic Acid Based Resin (A)>

The polylactic acid based resin (A) according to the present invention is characterized by having a moiety represented by the following formula (1) or (1') and having a weight average molecular weight (Mw) of 5,000 to 1,000,000. It is preferable that the moiety represented by the following formula (1) or (1') is included because the transparency at high crystallinity is realized easily. It is preferable that a moiety other than the moiety represented by the above-described formula (1) or (1') is formed through repetition of a lactic acid unit.

[Chemical formula 6]

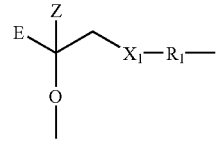

(1)

(In the formula (1), E represents a polymer residue, which is formed from an ethylene homopolymer, a copolymer of ethylene and an α-olefin having the carbon number of 3 to 20, or a homopolymer of an α-olefin having the carbon number of 3 to 20 and which has a weight average molecular weight (Mw) of 400 to 20,000, Z represents a H atom, an alkyl group, or an aralkyl group, $X_1$ represents an O atom or a S atom, and $R_1$ represents a single bond or a group represented by the following formula (2).)

[Chemical formula 7]

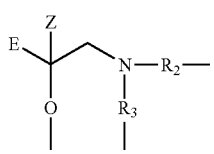

(1')

(In the formula (1'), E represents a polymer residue, which is formed from an ethylene homopolymer, a copolymer of ethylene and an α-olefin having the carbon number of 3 to 20, or a homopolymer of an α-olefin having the carbon number of 3 to 20 and which has a weight average molecular weight (Mw) of 400 to 20,000, Z represents a H atom, an alkyl group, or an aralkyl group, and $R_2$ and $R_3$ represent independently a single bond or a group represented by the following formula (2).)

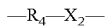 (2)

(In the formula (2), $R_4$ represents a divalent hydrocarbon group or a polyoxyalkylene group and $X_2$ represents an O atom, a S atom, or an NH group.)

In the case where E in the formula (1) or (1') is an ethylene homopolymer residue, a copolymer residue of ethylene and an α-olefin, or an α-olefin homopolymer residue, there is an advantage from the viewpoint of production of the E portion. It is more preferable that E is an ethylene homopolymer residue or a copolymer residue of ethylene and an α-olefin. The carbon number of the above-described α-olefin is usually 3 to 20, preferably 3 to 15, and more preferably 3 to 10. It is preferable that the carbon number of the above-described α-olefin is within the above-described range from the viewpoint of the versatility of the α-olefin. The weight average molecular weight (Mw) of E is usually 400 to 20,000, preferably 450 to 15,000, and more preferably 500 to 10,000.

In the case where Z in the formula (1) or (1') is a H atom, an alkyl group, or an aralkyl group, there is an advantage from the viewpoint of production of the moiety represented by the formula (1) or (1'). Furthermore, it is more preferable that Z is a H atom. The carbon number of the above-described alkyl group is preferably 1 to 18, more preferably 1 to 12, and further preferably within the range of 1 to 8. The carbon number of the above-described aralkyl group is preferably 7 to 15, more preferably 7 to 12, and further preferably within the range of 7 to 9.

In the formula (1), $X_1$ is preferably an O atom. Moreover, it is preferable that $R_1$ is a single bond or an oxyalkylene group having the carbon number of 1 to 6.

In the formula (1'), it is preferable that $R_2$ and $R_3$ are a single bond or an oxyalkylene group having the carbon number of 1 to 6.

In the above-described formula (2), in the case where $R_4$ is a divalent hydrocarbon group, the carbon number thereof is preferably 1 to 10, and more preferably 1 to 6. In the case where $R_4$ is a polyoxyalkylene group, the weight average molecular weight (relative to polystyrene) thereof is preferably 100 to 10,000, more preferably 200 to 6,000, and further preferably 200 to 4,000.

The weight average molecular weight (Mw) shown in the present invention refers to a value, relative to polystyrene, determined on the basis of gel permeation chromatography (GPC) (column temperature 40° C., chloroform solvent). However, regarding polyolefin having a single-end double bond (starting raw material), as described later, it is necessary that the measurement is conducted at a temperature of 140° C. by using ortho-dichlorobenzene as a solvent because of a solubility problem.

Furthermore, the "polylactic acid based resin" in the present invention refers to polymers containing 50 percent by mole or more of, and preferably 75 percent by mole or more of L-lactic acid unit and/or D-lactic acid unit and mixtures of these polymers.

The above-described polylactic acid based resin (A) can be produced by publicly known, publicly used methods. For example, the above-described polylactic acid based resin (A) can be produced by copolymerizing the polyolefin, which is disclosed in Japanese Unexamined Patent Application Publication No. 2006-131870 and the like and which has active hydrogen at an end, and a monomer containing lactide or lactic acid as a primary component. The polyolefin having active hydrogen at an end can be produced by, for example, using a polyolefin having a single-end double bond as a starting raw material, epoxidizing the double bond portion of the starting raw material, and adding a compound having active hydrogen to the resulting epoxy group.

In particular, it is preferable that the method for producing the above-described polylactic acid based resin (A) has the step of copolymerizing a polymer represented by the following formula (I) or (II) and lactide and/or lactic acid.

[Chemical formula 8]

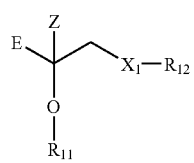

(I)

In the formula (I), E represents a polymer residue, which is formed from an ethylene homopolymer, a copolymer of ethylene and an α-olefin having the carbon number of 3 to 20, or a homopolymer of an α-olefin having the carbon number of 3 to 20 and which has a weight average molecular weight (Mw) of 400 to 20,000, Z represents a H atom, an alkyl group, or an aralkyl group, $X_1$ represents an O atom or a S atom, and $R_{11}$ and $R_{12}$ represent independently a H atom, a hydroxyalkyl group having the carbon number of 1 to 10, or a hydroxypolyoxyalkylene group having a weight average molecular weight (relative to standard polystyrene) of 200 to 6,000.

The above-described α-olefin having the carbon number of 3 to 20 is more preferably propylene or 1-butene, and is particularly preferably propylene. It is more preferable that $R_{11}$ and $R_{12}$ are independently a H atom or a hydroxyalkyl group having the carbon number of 1 to 10, and are particularly preferably a H atom at the same time.

[Chemical formula 9]

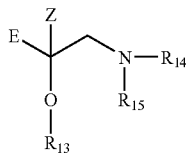

(II)

In the formula (II), E represents a polymer residue, which is formed from an ethylene homopolymer, a copolymer of ethylene and an α-olefin having the carbon number of 3 to 20, or a homopolymer of an α-olefin having the carbon number of 3 to 20 and which has a weight average molecular weight (Mw) of 400 to 20,000, Z represents a H atom, an alkyl group, or an aralkyl group, and $R_{13}$ to $R_{15}$ represent independently a H atom, a hydroxyalkyl group having the carbon number of 1 to 10, or a hydroxypolyoxyalkylene group having a weight average molecular weight (relative to standard polystyrene) of 200 to 6,000.

The above-described α-olefin having the carbon number of 3 to 20 is more preferably propylene or 1-butene, and is particularly preferably propylene. It is more preferable that $R_{14}$ and $R_{15}$ are independently a hydroxyalkyl group having the carbon number of 1 to 10. It is further preferable that they are independently a hydroxyalkyl group having the carbon number of 1 to 6. It is particularly preferably that they are a 2-hydroxyethyl group at the same time.

It is preferable that the above-described polyolefin having a single-end double bond has a molecular weight within a specific range, and a weight average molecular weight (Mw) within the range of 400 to 20,000 on the basis of the gel permeation chromatography (GPC) is preferable. If the weight average molecular weight (Mw) is less than the above-described range, the effect of the present invention is reduced, and if the above-described range is exceeded, unfavorably, a polyolefin portion and a polylactic acid resin portion are not mutually compatible, so as to become clouded.

The weight average molecular weight (Mw) of the group represented by E in the above-described formula (1) or (1'), which is an indispensable partial structure in the present invention, is resulted from the following formula (1-a) representing a compound produced by epoxidizing the single-end double bond shown in Japanese Unexamined Patent Application Publication No. 2006-131870 described above,

[Chemical formula 10]

(1-a)

(In the formula (1-a), E represents a polymer residue, which is formed from an ethylene homopolymer, a copolymer of ethylene and an α-olefin having the carbon number of 3 to 20, or a homopolymer of an α-olefin having the carbon number of 3 to 20 and which has a weight average molecular weight (Mw) of 400 to 20,000, and Z represents a H atom, an alkyl group, or an aralkyl group.).

That is, the weight average molecular weight (Mw) of the polymer residue represented by E can be determined as a value derived by subtracting a total molecular weight (42+ molecular weight of the Z group) of the epoxy group and the group represented by Z from weight average molecular weight (Mw) of the corresponding epoxy-containing polyolefin.

The monomers other than lactide and lactic acid include cyclic esters (lactones), e.g., caprolactone, propiolactone, and butyrolactone, and hydroxyalkanoic acids, e.g., hydroxybutanoic acid and hydroxypropanoic acid.

The content of the moiety represented by the above-described formula (1) or (1') in the above-described polylactic acid based resin (A) is preferably within the range of 0.1 to 15 percent by weight, and more preferably within the range of 0.5 to 10 percent by weight. It is preferable that the content is within the above-described range from the viewpoint of the polymer characteristics, e.g., the glass transition point the melting point of crystal, and the melt fluidity.

The actual content is determined as described below. The content of the moiety represented by the above-described formula (1) or (1') in the resin can be determined by quantifying the amount of unreacted monomer in production of the polylactic acid based resin (A) through reaction between a polyolefin compound, which has the structure represented by the above-described formula (1) or (1') and active hydrogen, and a lactic acid based monomer.

The above-described polylactic acid based resin (A) may be polymerized without using a solvent or by using a solvent. In the above-described polymerization, a solvent substantially inactive to the polymerization reaction can be used.

Examples of the above-described solvents include aliphatic hydrocarbons, e.g., hexane, heptane, and decane; halogenated aromatic hydrocarbons, e.g., chlorobenzene and o-dichlorobenzene; alicyclic hydrocarbons, e.g., cyclopentane and cyclohexane; aromatic hydrocarbons, e.g., benzene, toluene, xylene, mesitylene, ethylbenzene, and diethylbenzene; and ether based solvents, e.g., diethyl ether, dioxane, tetrahydrofuran (THF), and diglyme.

One type of these solvents may be used alone or at least two types may be used in combination.

Aromatic hydrocarbons, halogenated aromatic hydrocarbons, and ether based solvents are preferable from the viewpoint of the solubility of lactide or lactic acid, the reaction temperature, the reaction rate, the easiness of solvent removal after completion of the reaction. In particular, xylene, toluene, chlorobenzene, and o-dichlorobenzene are especially preferable.

In the case where the solvent is used in the polymerization, the usage thereof is selected within the range of 0.1 to 20 times on a weight basis, preferably 0.5 to 10 times on a weight basis, and more preferably 1.0 to 5 times on a weight basis relative to a total amount of the monomer and the polyolefin compound having the moiety represented by the above-described formula (1) or (1') and having active hydrogen, which are used in the production of the above-described polylactic acid based resin (A).

As for the production of the above-described polylactic acid based resin (A), alternatively, polymerization may be effected in the presence of a catalyst.

The above-described catalyst is not specifically limited insofar as the polylactic acid based resin (A) can be produced. Examples of the above-described catalysts include tin based catalysts, e.g., tin octoate (tin 2-ethylhexanoate), dibutyltin dilaurate, and tin chloride, titanium based catalysts, e.g., titanium chloride and titanium tetraisopropoxide, zinc based catalysts, e.g., zinc chloride and zinc acetate, and other publicly known catalysts.

Among them, tin based catalysts are preferable, and tin octoate is more preferable.

The usage of the above-described catalyst is 0.001 to 5 parts by weight, preferably 0.003 to 1 part by weight, and further preferably 0.005 to 0.1 parts by weight relative to 100 parts by weight of the total of lactide or lactic acid, the other monomers, and the polyolefin compound having the moiety represented by the above-described formula (1) or (1') and having active hydrogen.

The polymerization temperature is 60° C. to 250° C., and preferably is 100° C. to 230° C. In the case where the polymerization is effected without using a solvent, the above-described polymerization temperature is more preferably about 150° C. to 200° C. Furthermore, in the case where xylene is used as a solvent, tin octoate is used as a catalyst, and polymerization is effected by reacting the polyolefin compound having the moiety represented by the above-described formula (1) or (1') and having active hydrogen with lactide, the reaction temperature is more preferably about 110° C. to 150° C.

The polymerization time is different depending on the type of monomer used, the polymerization temperature, the amount of catalyst, and the like and is 0.1 to 24 hours, preferably 0.5 to 12 hours, and further preferably 1 to 6 hours.

The actual polymerization time can be determined by measuring the molecular weight through, for example, GPC (gel permeation chromatography) or the like and assuming the point in time when a predetermined molecular weight is reached to be an endpoint of the reaction.

The polylactic acid based resin (A) according to the present invention can be produced by various reaction methods, as described above. However, it is most preferable that the polyolefin compound having the moiety represented by the above-described formula (1) or (1') and having active hydrogen and lactide are used as lactic acid based monomers and the reaction is effected without using a solvent from the viewpoint of economy. At this time, as for the polymerization catalyst, the above-described tin based catalysts are preferable.

The weight average molecular weight (Mw) of the polylactic acid based resin (A) produced as described above is 5,000 to 1,000,000, preferably 10,000 to 500,000, and more preferably 50,000 to 300,000. It is preferable that the weight average molecular weight (Mw) of the polylactic acid based resin (A) is within the above-described range from the viewpoint of the mechanical strength of the polymer and the melt moldability.

The above-described weight average molecular weight (Mw) can be adjusted by controlling the ratio of amounts of the monomer and the catalyst used, presence or absence of a reaction solvent, the polymerization temperature, the polymerization time, and the like.

The above-described polylactic acid based resin (A) is used as an indispensable component of the polylactic acid based resin composition according to the present invention. The content of the above-described polylactic acid based resin (A) in the polylactic acid based resin composition according to the present invention is 5 to 95 percent by weight, and more preferably 10 to 90 percent by weight.

<Lactic Acid Based Resin>

As for the polylactic acid based resin composition according to the present invention, the above-described polylactic acid based resin (A) is used as the indispensable component and, furthermore, the polylactic acid based resin (B) other than the above-described polylactic acid based resin (A) may be contained, as necessary.

In the case where the above-described polylactic acid based resin (B) is used in the polylactic acid based resin composition according to the present invention, the content thereof is not specifically limited. However, the content of the polylactic acid based resin (B) is usually within the range of 5 to 95 parts by weight, preferably within the range of 10 to 80 parts by weight, and further preferably within the range of 20 to 50 parts by weight relative to 100 parts by weight of a total of the polylactic acid based resin (A) and the polylactic acid based resin (B). In the case where the content of the polylactic acid based resin (B) is within the above-described range, a composition having excellent heat resistance and transparency is produced.

The above-described polylactic acid based resin (B) is produced through, for example, homopolymerization of lactic acid or lactide or copolymerization of lactic acid or lactide and copolymerizable compounds, e.g., other monomers or polymers. However, the other polymers copolymerizable with lactic acid or lactide are polymers excluding the polyolefin compound having the moiety represented by the above-described formula (1) or (1') and having active hydrogen. It is particularly preferable that the polylactic acid based resin (B) contained in the polylactic acid based resin composition according to the present invention is a polylactic acid from the viewpoint of economy.

It is one preferable aspect of the present invention that the above-described polylactic acid based resin (B) is a polylactic acid based resin having 100% of lactic acid unit.

It is desirable that the above-described poly lactic acid is a polylactic acid having 95 percent by mole or more, and preferably 97 percent by mole or more of structural unit derived from L-lactic acid or D-lactic acid.

The above-described polylactic acid is produced through polycondensation of lactic acid or ring-opening polymerization of lactide which is a circular dimer of lactic acid.

As for the above-described polylactic acid based resin (B), as described above, a copolymer produced through copolymerization of lactic acid or lactide and copolymerizable compounds, e.g., other monomers or polymers, can also be used. However, the polymers copolymerizable with lactic acid or lactide are polymers excluding the polyolefin compound having the moiety represented by the above-described formula (1) or (1') and having active hydrogen.

Examples of the other monomers or polymers copolymerizable with lactic acid or lactide include hydroxycarboxylic acids, e.g., glycolic acid and caproic acid; circular esters, e.g., γ-butyrolactone and ε-caprolactone; circular amides, e.g., ε-caprolactam; polyhydric alcohols of bifunctional or more, e.g., ethylene glycol, diethylene glycol, triethylene glycol, polyethylene glycol, propylene glycol, dipropylene glycol, ethylene glycol/propylene glycol copolymers, 1,3-butanediol, 1,4-butanediol, 3-methyl-1,5-pentanediol, 1,6-hexanediol, 1,9-nonanediol, neopentyl glycol, polytetramethylene glycol, glycerin, and trimethylol propane; aliphatic polyvalent carboxylic acids, e.g., succinic acid and adipic acid; polyvalent isocyanates, e.g., xylylene diisocyanate and 2,4-tolylene diisocyanate; and polysaccharides, e.g., cellulose, acetyl cellulose, and ethyl cellulose.

The above-described copolymer may be any one of a random copolymer, an alternating copolymer, a block copolymer, a graft copolymer, and the like. Furthermore, at least a part of the above-described copolymer may has any structure of linear, circular, branched, star, three-dimensional network, and other structures.

Moreover, the weight average molecular weight (Mw) of the above-described polylactic acid based resin (B) is preferably within the range of 5,000 to 1,000,000, more preferably within the range of 10,000 to 500,000, and further preferably within the range of 50,000 to 300,000. It is preferable that the weight average molecular weight (Mw) of the above-described polylactic acid based resin (B) is within the above-described range from the viewpoint of the mechanical strength of the polymer and the melt moldability.

In addition, it is preferable that the above-described polylactic acid based resin (B) has the moiety represented by the following general formula (3). It is preferable that the moiety represented by the following general formula (3) is included because the transparency at high crystallinity is realized easily.

(In the formula (3), $X_3$ and $X_4$ represent independently an O atom, a S atom, or an NH group, $R_5$ represents a divalent hydrocarbon group containing at least one aromatic ring or aliphatic ring, and the hydrocarbon group may contain an O atom, a N atom, or a S atom.)

In the case where $R_5$ described above is a group other than the group formed from dicarboxylic acid and diol, it is preferable that the carbon number of $R_5$ is 5 to 50.

Examples of polylactic acid based resins (B) having the moiety represented by the above-described formula (3) include the following polylactic acid based resins (B1) to (B5). The polylactic acid based resins (B1) to (B5) are preferable because the transparency at high crystallinity is realized easily.

Polylactic acid based resin (B1): Polylactic acid based resin, in which the moiety represented by the above-described formula (3) is represented by the following formula (6).

[Chemical formula 11]

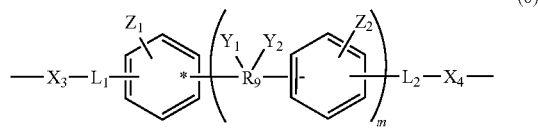

In the formula (6), $X_3$ and $X_4$ represent independently an O atom, a S atom, or an NH group, $R_9$ represents a single bond or a hydrocarbon group having the carbon number of 1 to 10, the hydrocarbon group may be any one of linear, branched, and circular, $Y_1$ and $Y_2$ represent independently a saturated hydrocarbon group having the carbon number of 1 to 10, an aryl group having the carbon number of 6 to 10, or a hydrogen atom, and are not present in the case where $R_9$ is a single bond, $L_1$ and $L_2$ represent independently an alkylene group having the carbon number of 1 to 8 or an oxyalkylene group having the carbon number of 1 to 8, $Z_1$ and $Z_2$ represent independently a hydrocarbon group having the carbon number of 1 to 10 or a hydrogen atom, $Y_1$ and $Y_2$, $Y_1$ and $Z_1$, and $Y_2$ and $Z_2$ may be mutually bonded independently so as to form rings, and m represents an integer of 0 to 5.

Polylactic acid based resin (B2): Polylactic acid based resin, in which the moiety represented by the above-described formula (3) is represented by the following formula (7).

[Chemical formula 12]

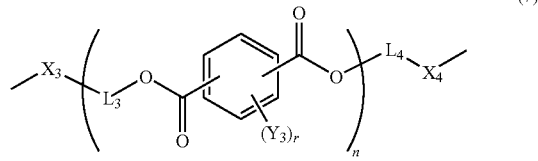

In the formula (7), $X_3$ and $X_4$ represent independently an O atom, a S atom, or an NH group, $Y_3$ represents a hydrogen atom, a saturated hydrocarbon group having the carbon number of 1 to 8, an aryl group having the carbon number of 6 to 8, or an aralkyl group having the carbon number of 7 or 8, the saturated hydrocarbon group may be any one of linear, branched, and circular, r represents an integer of 0 to 4, $L_3$ and $L_4$ represent independently an alkylene group having the carbon number of 2 to 8 or a cycloalkylene group having the carbon number of 3 to 8, and n represents an integer of 1 to 100.

Polylactic acid based resin (B3): Polylactic acid based resin, in which the moiety represented by the above-described formula (3) is represented by the following formula (8).

[Chemical formula 13]

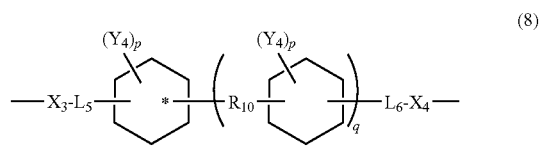

In the formula (8), $X_3$ and $X_4$ represent independently an O atom, a S atom, or an NH group, $Y_4$ represents a hydrogen atom or a hydrocarbon group having the carbon number of 1 to 8, the hydrocarbon group may be any one of linear, branched, and circular, $R_{10}$, $L_5$ and $L_6$ represent independently a single bond or an alkylene group having the carbon number of 1 to 8, p represents an integer of 0 to 4, and q represents an integer of 0 to 5.

Polylactic acid based resin (B4): Polylactic acid based resin, in which the moiety represented by the above-described formula (3) is represented by the following formula (9).

[Chemical formula 14]

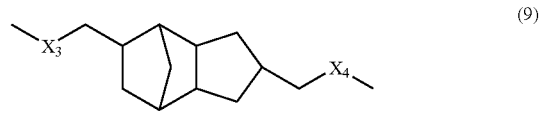

In the formula (9), $X_3$ and $X_4$ represent independently an O atom, a S atom, or an NH group.

Polylactic acid based resin (B5): Polylactic acid based resin, in which the moiety represented by the above-described formula (3) is represented by the following formula (10).

[Chemical formula 15]

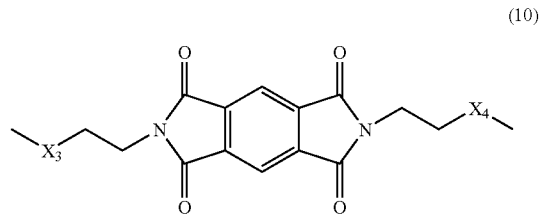

In the formula (10), $X_3$ and $X_4$ represent independently an O atom, a S atom, or an NH group.

The above-described polylactic acid based resin (B) can be produced by publicly known, publicly used methods. For example, production can be conducted by copolymerizing compounds having the moieties represented by the above-described formulae (6) to (10) and monomers containing lactic acid or lactide as a primary component.

The compounds having the moiety represented by the above-described formula (6) include a compound, which is represented by the following formula (6a) and which has a hydroxyl group, a thiol group, or an amino group.

[Chemical formula 16]

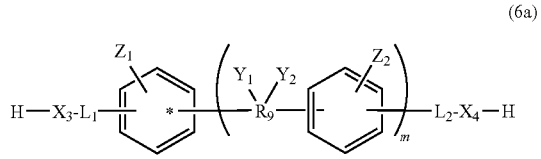

(6a)

In the formula (6a), $X_3$, $X_4$, $R_9$, $Y_1$, $Y_2$, $L_1$, $L_2$, $Z_1$, $Z_2$, and m are synonymous with $X_3$, $X_4$, $R_9$, $Y_1$, $Y_2$, $L_1$, $L_2$, $Z_1$, $Z_2$, and m in the above-described formula (6).

In the formula (6a), $X_3$ and $X_4$ are preferably an O atom or an NH group, $L_1$ and $L_2$ are preferably a methylene group, an oxymethylene group, an ethylene group, an oxyethylene group, a 1,2-propylene group, an oxy-1,2-propylene group, a trimethylene group, an oxytrimethylene group, a 2,3-butylene group, an oxy-2,3-butylene group, a tetramethylene group, an oxytetramethylene group, a cyclohexylene group, or an oxycyclohexylene group, $Z_1$ and $Z_2$ are preferably a hydrogen atom, a methyl group, an ethyl group, an isopropyl group, or a t-butyl group, $Y_1$ and $Y_2$ are preferably a hydrogen atom, a methyl group, an ethyl group, an isopropyl group, a phenyl group, or a cyclohexyl group, and $R_9$ is preferably a single bond, a methyl group, a methylene group, or a methine group.

The compounds having the moiety represented by the above-described formula (7) include a compound, which is represented by the following formula (7a) and which has a hydroxyl group, a thiol group, or an amino group.

[Chemical formula 17]

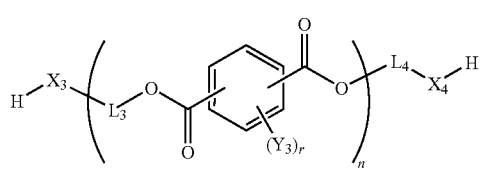

(7a)

In the formula (7a), $X_3$, $X_4$, $Y_3$, $L_3$, r and n are synonymous with $X_3$, $X_4$, $Y_3$, $L_3$, $L_4$, r and n in the above-described formula (7).

In the formula (7a), $X_3$ and $X_4$ are preferably an O atom or an NH group, $L_3$ and $L_4$ are preferably a methylene group, an ethylene group, a 1,2-propylene group, a trimethylene group, a 2,3-butylene group, a tetramethylene group, a pentamethylene group, a hexamethylene group, a heptamethylene group, an octamethylene group, and a cyclohexylene group, and $Y_3$ is preferably a hydrogen atom, a methyl group, an ethyl group, an isopropyl group, a phenyl group, a benzyl group, and a cyclohexyl group.

The compounds having the moiety represented by the above-described formula (8) include a compound, which is represented by the following formula (8a) and which has a hydroxyl group, a thiol group, or an amino group.

[Chemical formula 18]

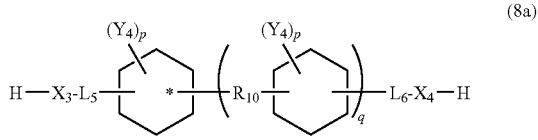

(8a)

In the formula (8a), $X_3$, $X_4$, $Y_4$, $R_{10}$, $L_5$, $L_6$, p, and q are synonymous with $X_3$, $X_4$, $Y_4$, $R_{10}$, $L_5$, $L_6$, p, and q in the above-described formula (8).

In the formula (8a), $X_3$ and $X_4$ are preferably an O atom or an NH group, $L_5$ and $L_6$ are preferably a single bond, a methylene group, or an ethylene group, $R_{10}$ is preferably a single bond, a methylene group, an ethylene group, and an isopropylidene group, and $Y_4$ is preferably a hydrogen atom, a methyl group, an ethyl group, an isopropyl group, and a cyclohexyl group.

The compounds having the moiety represented by the above-described formula (9) include a compound, which is represented by the following formula (9a) and which has a hydroxyl group, a thiol group, or an amino group.

[Chemical formula 19]

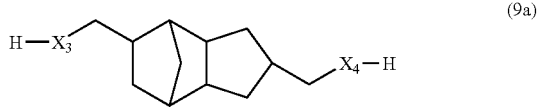

(9a)

In the formula (9a), $X_3$ and $X_4$ represent independently an O atom, a S atom, or an NH group, and an O atom or an NH group is preferable.

The compounds having the moiety represented by the above-described formula (10) include a compound, which is represented by the following formula (10a) and which has a hydroxyl group, a thiol group, or an amino group.

[Chemical formula 20]

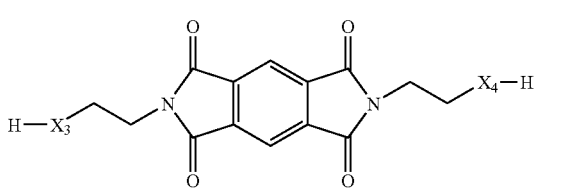

(10a)

In the formula (10a), $X_3$ and $X_4$ represent independently an O atom, a S atom, or an NH group, and an O atom or an NH group is preferable.

Preferable specific examples of the compounds having the moiety represented by the above-described formulae (6a) to (10a) include aliphatic ring-containing diols and aromatic ring-containing diols.

The above-described aliphatic ring-containing diols, for example, include 1,4-cyclohexanediol:

[Chemical formula 21]

1,3-cyclohexanediol:

[Chemical formula 22]

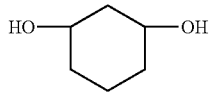

4,4'-bicyclohexanol:

[Chemical formula 23]

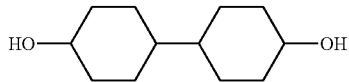

4,4'-isopropylidenedicyclohexanol (2,2-bis(4-hydroxycyclohexyl)propane):

[Chemical formula 24]

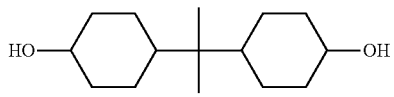

4,4'-methylenedicyclohexanol:

[Chemical formula 25]

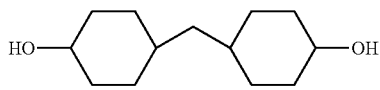

and
4,8-bis(hydroxymethyl)tricyclo(5.2.1.0 2,6)decane:

[Chemical formula 26]

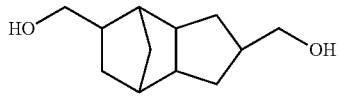

Furthermore, the above-described aromatic ring-containing diols, for example, include
4,4-xylylene glycol:

[Chemical formula 27]

4,4'-biphenylene glycol:

[Chemical formula 28]

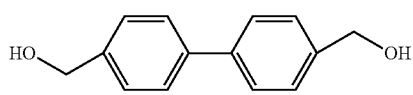

6,6'-bis(2-hydroxyethoxy)-3,3,3',3'-tetramethyl-1,1-spirobi-indane:

[Chemical formula 29]

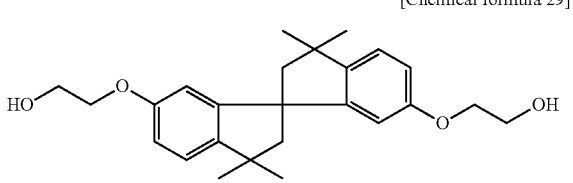

4,4'-(fluorenylidene)bis(2-phenoxyethanol):

[Chemical formula 30]

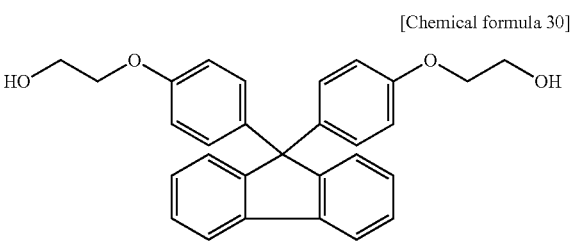

N,N'-bis(2-hydroxyethyl)-pyromellitimide:

[Chemical formula 31]

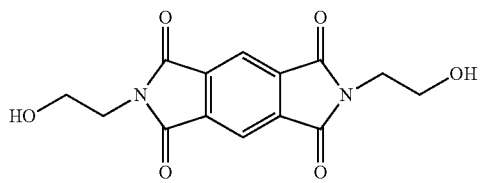

and
2,2'-bis(4-(2-hydroxyethoxy)phenyl)propane:

[Chemical formula 32]

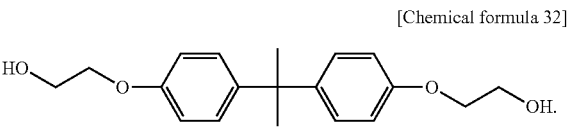

The use of such compounds is preferable because the transparency at high crystallinity is realized easily.

The compounds having the moieties represented by the above-described formulae (6a) to (10a) other than the above-described compounds include polyesters having hydroxyl groups at both ends.

The polyesters having hydroxyl groups at both ends are produced through polycondensation of aromatic dicarboxylic acids, aromatic dicarboxylic acid esters, or acid halides of aromatic dicarboxylic acids and alkylenediols having the carbon number of 2 to 8 or cycloalkylenediols.

Examples of the above-described aromatic dicarboxylic acids, aromatic dicarboxylic acid esters, and acid halides of aromatic dicarboxylic acids include terephthalic acid, dimethyl terephthalate, terephthalic acid chloride, isophthalic acid, dimethyl isophthalate, and isophthalic acid chloride.

Examples of the above-described alkylenediols having the carbon number of 2 to 8 or cycloalkylenediols include ethylene glycol, diethylene glycol, triethylene glycol, 1,3-propanediol, 1,4-butanediol, 1,5-pentanediol, 1,6-hexanediol, 1,7-heptanediol, 1,8-octanediol, and 1,4-cyclohexane-dimethanol.

The above-described polyesters having hydroxyl groups at both ends can be produced by using diols excessively, effecting condensation by a common method, and removing an excess amount of diols.

The weight average molecular weights (Mw) of the above-described polyesters having hydroxyl groups at both ends are preferably within the range of 500 to 10,000, and more preferably within the range of 1,000 to 7,000.

This weight average molecular weight (Mw) can be determined by comparison with the standard polystyrene on the basis of the measurement through GPC (gel permeation chromatography), as in the above description.

Furthermore, in the compounds having the above-described moieties, the aromatic rings, the aliphatic rings, side chains, and the like may have substituents.

In production of copolymers of lactic acid or lactide and the other monomers as the above-described polylactic acid based resin (B), the amounts of addition of the compounds having the above-described moieties are not specifically limited insofar as the above-described polylactic acid based resin (B) is produced. However, 0.001 to 10 parts by weight is preferable relative to 100 parts by weight of the monomer containing lactide or lactic acid as a primary component, 0.01 to 5 parts by weight is more preferable, and 0.1 to 3 parts by weight is further preferable.

In addition, the details of production of the polylactic acid based resin (B) having the above-described moiety are the same as those in production of the polylactic acid based resin (A) according to the present invention.

Moreover, it is preferable that the above-described polylactic acid based resin (B) has a moiety represented by the following general formula (4). It is preferable that the moiety represented by the following general formula (4) is included because the transparency at high crystallinity is realized easily.

(4)

(In the formula (4), $X_3$ and $X_4$ represent independently an O atom, a S atom, or an NH group, $R_6$ represents a divalent aliphatic hydrocarbon group containing no ring structure and having a weight average molecular weight (Mw) of 25 to 50,000, and the hydrocarbon group may contain an O atom, a N atom, or a S atom.)

In the above-described formula (4), it is preferable that $R_6$ is a divalent aliphatic hydrocarbon group containing no ring structure and having a weight average molecular weight (Mw) of 25 to 50,000 because the transparency at high crystallinity is realized easily.

The moiety represented by the above-described formula (4) is preferably a moiety derived from at least one type selected from diols, polyesters having hydroxyl groups at both ends, and polycarbonates having hydroxyl groups at both ends, and the above-described diol is preferably at least one type selected from alkylene glycols, polymethylene glycols, and polyalkylene glycols.

The method for producing the polylactic acid based resins (B) having these moieties is also the same as that for the polylactic acid based resin (A) according to the present invention.

Furthermore, it is preferable that the above-described polylactic acid based resin (B) has a moiety, which is formed from a repetition unit represented by the following formula (5) and which has a weight average molecular weight (Mw) within the range of 100 to 10,000. It is preferable that such a moiety is included because the transparency at high crystallinity is realized easily.

[Chemical formula 33]

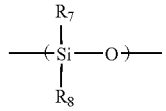
(5)

(In the formula (5), $R_7$ and $R_8$ represent independently a linear or branched alkyl group having the carbon number of 1 to 5 or an aryl group having the carbon number of 6 to 10 and may be the same or different.)

It is preferable that $R_7$ and $R_8$ in the formula (5) are independently a linear or branched alkyl group having the carbon number of 1 to 5 or an aryl group having the carbon number of 6 to 10 because the transparency at high crystallinity is realized easily.

The above-described polylactic acid based resin (B) can be produced by, for example, copolymerizing a modified silicone compound, which has a moiety formed from a repetition unit represented by the above-described formula (5) and which has a group, e.g., a hydroxyl group or an amino group, having active hydrogen, and a monomer containing lactide or lactic acid as a primary component.

Examples of linear or branched alkyl groups having the carbon number of 1 to 5 as $R_7$ and $R_8$ described above include a methyl group, an ethyl group, a n-propyl group, an isopropyl group, a n-butyl group, an isobutyl group, a t-butyl group, a n-pentyl group, an isopentyl group, and a neopentyl group.

Among the above-described alkyl groups, a methyl group is preferable.

Examples of aryl groups having the carbon number of 6 to 10 as $R_7$ and $R_8$ described above include a phenyl group, a tolyl group, a xylyl group, a mesityl group, an ethylphenyl group, and a t-butylphenyl group.

Among the above-described aryl groups, a phenyl group is preferable.

$R_7$ and $R_8$ may be the same or different.

Examples of the above-described modified silicone compounds include dual-end modified hydroxyl-modified silicone compounds, e.g., KF-6001, KF-6002, and KF-6003 (produced by Shin-Etsu Chemical Co., Ltd.); single-end modified hydroxyl modification-containing silicone, e.g., X-22-170BX and X-22-170DX (produced by Shin-Etsu Chemical Co., Ltd.); single-end modified diol-containing silicone, e.g., X-22-176DX and X-22-176F (produced by Shin-Etsu Chemical Co., Ltd.); side-chain modified hydroxyl-containing silicone, e.g., X-22-4039 and X-22-4015 (produced by Shin-Etsu Chemical Co., Ltd.); dual-end modified mercapto-containing silicone, e.g., X-22-167B (produced by Shin-Etsu Chemical Co., Ltd.); side-chain modified mercapto-containing silicone, e.g., KF-2001 and KF-2004 (produced by Shin-Etsu Chemical Co., Ltd.); dual-end modified amino-containing silicone, e.g., PAM-E, KF-8010, KF-8008, X-22-161A, X-22-1660B-3 (produced by Shin-Etsu Chemical Co., Ltd.); dual-end modified carboxyl-containing silicone, e.g., X-22-162C (produced by Shin-Etsu Chemical Co., Ltd.); and dual-end modified silanol-containing silicone, e.g., X-21-5841 and KF-9701 (produced by Shin-Etsu Chemical Co., Ltd.).

The method for producing the polylactic acid based resins (B) having these moieties is also the same as that for the polylactic acid based resin (A) according to the present invention.

<Transparent Nucleator (C)>

The polylactic acid based resin composition according to the present invention may contain a transparent nucleator, (C), as necessary. Here, the "transparent nucleator" is an agent added to the polylactic acid based resins (A) so as to serve as a nucleator in crystallization and give the transparency. Specific examples thereof includes carboxylic acid amides, aliphatic alcohols, and aliphatic carboxylic acid esters. One type thereof may be used alone or at least two types may be used in combination.

Specific examples of carboxylic acid amides include aliphatic monocarboxylic acid amides, e.g., lauric acid amide, palmitic acid amide, oleic acid amide, stearic acid amide, erucic acid amide, behenic acid amide, ricinoleic acid amide, and hydroxystearic acid amide; N-substituted aliphatic monocarboxylic acid amides, e.g., N-oleylpalmitic acid amide, N-oleyloleic acid amide, N-oleylstearic acid amide, N-stearyloleic acid amide, N-stearylstearic acid amide, N-stearylerucic acid amide, methylolstearic acid amide, and methylolbehenic acid amide; aliphatic biscarboxylic acid amides, e.g., methylenebisstearic acid amide, ethylenebisstearic acid amide, ethylenebislauric acid amide, ethylenebiscapric acid amide, ethylenebiserucic acid amide, ethylenebisbehenic acid amide, ethylenebisisostearic acid amide, ethylenebishydroxystearic acid amide, butylenebisstearic acid amide, hexamethylenebisoleic acid amide, hexamethylenebisstearic acid amide, hexamethylenebisbehenic acid amide, hexamethylenebishydroxystearic acid amide, m-xylylenebisoleic acid amide, m-xylylenebisstearic acid amide, m-xylylenebisbehenic acid amide, and m-xylylenebishydroxystearic acid amide; N-substituted aliphatic carboxylic acid bisamides, e.g., N,N'-dioleylsebacic acid amide, N,N'-dioleyladipic acid amide, N,N'-distearyladipic acid amide, N,N'-distearylsebacic acid amide, N,N'-distearylisophthalic acid amide, and N,N'-distearylterephthalic acid amide; and N-substituted ureas, e.g., N-butyl-N'-stearyl urea, N-propyl-N'-stearyl urea, N-stearyl-N'-stearyl urea, N-phenyl-N'-stearyl urea, xylylenebisstearyl urea, xylylenebisstearyl urea, toluylenebisstearyl urea, hexamethylenebisstearyl urea, diphenylmethanebisstearyl urea, and diphenylmethanebislauryl urea.

Among them, the above-described transparent nucleator (C) is preferably at least one type of carboxylic acid amide selected from the group consisting of lauric acid amide, palmitic acid amide, stearic acid amide, erucic acid amide, behenic acid amide, ricinoleic acid amide, hydroxystearic acid amide, N-oleylpalmitic acid amide, N-stearylerucic acid amide, ethylenebiscapric acid amide, ethylenebislauric acid amide, ethylenebisstearic acid amide, ethylenebisoleic acid amide, ethylenebis-1,2-hydroxystearic acid amide, hexamethylenebiscapric acid amide, hexamethylenebislauric acid amide, hexamethylenebisstearic acid amide, hexamethylenebisoleic acid amide, hexamethylenebis-1,2-hydroxystearic acid amide, m-xylylenebiscapric acid amide, m-xylylenebislauric acid amide, m-xylylenebisstearic acid amide, m-xylylenebisoleic acid amide, and m-xylylenebis-1,2-hydroxystearic acid amide. Such carboxylic acid amides are preferable because the transparency at high crystallinity is realized easily.

Furthermore, among them, biscarboxylic acid amides are used favorably. In particular, ethylenebislauric acid amide, ethylenebisoleic acid amide, ethylenebisstearic acid amide, ethylenebis-1,2-hydroxystearic acid amide, hexamethylenebislauric acid amide, hexamethylenebisoleic acid amide, hexamethylenebis-1,2-hydroxystearic acid amide, m-xylylenebislauric acid amide, m-xylylenebisoleic acid amide, and m-xylylenebis-1,2-hydroxystearic acid amide are preferable. Moreover, ethylenebislauric acid amide, ethylenebisoleic acid amide, ethylenebis-1,2-hydroxystearic acid amide, ethylenebisstearic acid amide, hexamethylenebislauric acid amide, hexamethylenebisoleic acid amide, and hexamethylenebis-1,2-hydroxystearic acid amide, which have no aromatic ring in the molecule, are preferable because the crystallization rate is excellent.

Specific examples of aliphatic alcohols include pentadecyl alcohol, cetyl alcohol, heptadecyl alcohol, 1,6-hexanediol, 1,8-octanediol, cyclohexane 1,2-diol, and cyclohexane 1,4-diol.

Specific examples of aliphatic carboxylic acid esters include lauric acid cetyl ester, palmitic acid cetyl ester, stearic acid cetyl ester, dilauric acid glycol, dipalmitic acid glycol, monolauric acid glycerin ester, and monostearic acid glycerin ester.

The above-described transparent nucleator (C) can be used in an amount within the range of 0.1 to 10 parts by weight, preferably 0.2 to 5 parts by weight, and further preferably 0.3 to 3 parts by weight relative to 100 parts by weight of the above-described polylactic acid based resin (A) or 100 parts by weight of a total of the above-described polylactic acid based resin (A) and the above-described polylactic acid based resin (B) used as necessary. In the case where the content of the transparent nucleator (C) is within the above-described range, the effect of the transparent nucleator is realized to a great extent, and a resin composition exhibiting a high crystallization rate and the transparency in combination is produced.

<Various Additives and the Like>

The polylactic acid based resin composition according to the present invention may contain other resins, additives, and the like within the bounds of not impairing the feature of the present invention.

Resins other than the above-described components (A) to (C) or polymers and various additives may be added to the polylactic acid based resin composition according to the present invention in accordance with the purposes (for example, improvement in moldability, secondary workability, decomposition property, tensile strength, heat resistance, preservation stability, weather resistance, flame retardancy, and the like).

Examples of other resins or polymers include polycarbonate resins, unmodified polyolefins, vinyl based resins, polystyrenes, polyamides, acrylic resins, polyphenylene sulfide resins, polyether ether ketone resins, polyesters, polysulfones, polyphenylene oxides, polyimides, polyetherimides, acrylonitrile-butadiene-styrene copolymers (ABS), ethylene-α-olefin copolymers, conjugated diene based rubber, styrene based rubber, phenol resins, melamine resins, polyester resins, silicone resins, and epoxy resins. One type thereof may be used alone or at least two types may be used in combination.

Examples of various additives include plasticizers, antioxidants, ultraviolet absorbers, heat stabilizers, flame retardants, internal mold release agents, inorganic additives, organic additives, antistatic agents, surface wettability improvers, incineration auxiliaries, pigments, dyes, nucleators, lubricants, and natural products. Preferably, plasticizers are mentioned.

Examples of plasticizers include triacetin, triethylene glycol diacetate, acetyl triethyl citrate, acetyl tributyl citrate, and dibutyl sebacate.

Inorganic additives and lubricants can be used for preventing blocking of a film or a sheet and improving a sliding property. Examples of such inorganic additives include silica, mica, talc, glass fibers, glass beads, kaolin, kaolinite, barium sulfate, calcium sulfate, magnesium hydroxide, Wollastonite, carbon fibers, calcium silicate fibers, magnesium oxysulfate fibers, potassium titanate fibers, calcium sulfite, white carbon, clay, montmorillonite, titanium oxide, and zinc oxide. One type thereof may be used alone or at least two types may be used in combination. In particular, an improvement in the heat resistance of the resin composition can be expected by using the glass fiber as the inorganic additive.

Examples of organic additives include starch and derivatives thereof, cellulose and derivatives thereof, pulp and derivatives thereof, paper and derivatives thereof, wheat flour, soybean fibers, wheat bran, coconut shells, coffee grounds, low molecular weight materials of proteins, phthalic acid base, aliphatic polybasic acid base, glycerin base, citric acid base, glycol base, and olefin base, polyethylene terephthalate fibers, polyethylene naphthalate fibers, and aramid fibers. One type thereof may be used alone or at least two types may be used in combination.

The amount of addition of the other resin, the polymer, or the additive is selected appropriately in accordance with the use within the bounds of not impairing the object of the present invention.

<Polylactic Acid Based Resin Composition>

The polylactic acid based resin composition according to the present invention is characterized by containing 5 to 95 percent by weight of the above-described polylactic acid based resin (A) as an indispensable component. It is preferable that the above-described polylactic acid based resin (A) within the above-described range is contained because the transparency at high crystallinity is realized easily.

Furthermore, it is preferable that the polylactic acid based resin composition according to the present invention contains 5 to 95 parts by weight of polylactic acid based resin (A) and 95 to 5 parts by weight of polylactic acid based resin (B) other than the above-described polylactic acid based resin (A) (where a total of the polylactic acid based resins (A) and (B) is assumed to be 100 parts by weight). It is preferable that the polylactic acid based resin composition contains the polylactic acid based resins (A) and (B) at proportions within the above-described ranges because the transparency at high crystallinity is realized easily.

Moreover, it is preferable that the polylactic acid based resin composition according to the present invention further contains 0.1 to 10 parts by weight of the above-described transparent nucleate (C) relative to 100 parts by weight of the above-described polylactic acid based resin (A) or 100 parts by weight of a total of the above-described polylactic acid based resins (A) and (B). It is preferable that the above-described transparent nucleate (C) is contained at a proportion within the above-described range because the transparency at high crystallinity is realized easily.

The polylactic acid based resin composition according to the present invention is excellent from the viewpoint of a large crystallization rate. Here, the "crystallization rate" in the present invention is determined on the basis of the time from the start of keeping at a predetermined temperature until an exothermic peak reaches a maximum value (hereafter may be referred to as an "isothermal crystallization time") in differential scanning calorimetry (DSC), where after the temperature of a polymer is raised so as to effect melting, cooling is conducted to the predetermined temperature at a constant rate, and the predetermined temperature is kept. In the case where this time is small, the crystallization rate is large. The above-described predetermined temperature is selected appropriately in accordance with a polymer to be measured.

Specifically, in the case where a resin is formed from a unit derived from lactic acid, as in the present invention, the above-described isothermal crystallization time is determined on the basis of the time from the completion of cooling to a predetermined temperature until an exothermic peak reaches a maximum value, where 5 to 6 mg of the film-shaped polymer is weighed into a pan sealed with nitrogen, putting into a DSC measurement portion, which is sealed with nitrogen and which is set at 30° C. in advance, is conducted, the temperature is raised at a temperature rising rate of 100° C./min so as to effect melting at 220° C. for 3 minutes and, thereafter, cooling is conducted to the predetermined crystallization temperature (for example, 100° C.) at a cooling rate of 99° C./min, followed by keeping.

Regarding the polylactic acid based resin composition according to the present invention, in the case where the composition is melted at 220° C. for 3 minutes and, thereafter, cooling is conducted to 100° C. at a cooling rate of 99° C./min, followed by keeping at 100° C., the isothermal crystallization time is within 5 minutes, preferably 0.1 to 4 minutes, and further preferably 1 to 3 minutes.

<Method for Producing Polylactic Acid Based Resin Composition>

As for the method for producing the polylactic acid based resin composition according to the present invention, publicly known producing methods can be adopted appropriately. For example, a method, in which a high-speed agitator or a low-speed agitator is used, individual components are mixed homogeneously in advance and, thereafter, melt kneading is conducted with a single-screw or multi-screw extruder exhibiting sufficient kneading performance at a resin melting point or higher, a method, in which mixing and kneading are conducted in melting, a method, in which mixing is conducted in a solution and, thereafter, a solvent is removed, and the like can be adopted.

The production of the polylactic acid based resin composition may be conducted before molding of a molded body, or the production of the composition and the molding may be conducted at the same time. In the case where the composition is produced before the molding, it is preferable that the shape of the resin composition is pellets, a rod, a powder, or the like.

<Molded Body>

The molded body according to the present invention is characterized by being formed from the above-described polylactic acid based resin (A) or the above-described polylactic acid based resin composition, having a haze of 0.1% to 15%, preferably 0.1% to 12%, and further preferably 0.1% to 11% at a thickness of 100 μm and a crystallinity of 35% or more, preferably 38% to 60%, and further preferably 40% to 55%, after anneal (heat treatment) at 105° C. for 60 seconds.

The molded body according to the present invention can be produced by publicly known, publicly used methods, for example, the following methods.

(1) Regarding extrusion molding, a film or a sheet can be formed by molding the polylactic acid based resin (A) or the polylactic acid based resin composition according to the present invention with a general T-die extruder.

(2) Regarding injection molding, pellets of the polylactic acid based resin (A) or the polylactic acid based resin composition according to the present invention are melted and softened and are filled into a mold, so that a molded body is produced with a molding cycle of 20 to 300 seconds.

(3) Regarding blow molding (injection blow molding, stretch blow molding, direct blow molding), for example, in the case of injection blow molding, pellets of the polylactic acid based resin (A) or the polylactic acid based resin composition according to the present invention are melted with a general injection blow molding machine and are filled into a mold, so that a preform is produced. The resulting perform is reheated in an oven (furnace) and, thereafter, is put into a mold kept at a constant temperature. Blowing is conducted by feeding pressure air, so that a blow bottle can be produced.

(4) Regarding vacuum molding and vacuum-pressure molding, a film or a sheet molded by the same method as the extrusion molding of the above-described item (1) is used as a perform. The resulting perform is heated so as to be softened temporally. Thereafter, a general vacuum molding machine is used and vacuum molding or vacuum-pressure molding is conducted in a mold kept at a constant temperature, so that a molded body can be produced.

(5) Regarding laminate molding, a laminated molded body can be produced by, for example, a method, in which a film or a sheet produced by the extrusion molding method described above in the item (1) and other base material are laminated with an adhesive or heat; an extrusion lamination method, in which a molten resin is extruded directly on a base material, e.g., paper, metal, plastic, or the like from a T-die by the same method as the extrusion molding method described above in the item (1); a coextrusion method, in which the polylactic acid based resin (A) or the polylactic acid based resin composition according to the present invention and the like are melted individually with respective extruders, and are joined with a die head so as to be extruded at the same time; and coextrusion lamination, in which the above-described methods are combined.

(6) Regarding tape yarn molding, a film or a sheet molded by the same method as the extrusion molding method described above in the item (1) is slit into a specific width, uniaxial thermal stretching is conducted at a temperature within the range of 60° C. to 140° C., and thermal fixing is further conducted at a temperature within the range of 80° C. to 160° C., as necessary, so that a molded body can be produced.

(7) Regarding string forming, a string can be produced by a melt spinning method, in which the polylactic acid based resin (A) or the polylactic acid based resin composition according to the present invention is melted at a temperature of 150° C. to 240° C. by using an extruder, so as to be discharged from a spinning nozzle. The string can be formed by conducting uniaxial thermal stretching at a temperature within the range of 60° C. to 100° C., as necessary, and in some cases, further conducting thermal fixing at a temperature within the range of 80° C. to 140° C.

(8) Regarding nonwoven fabric forming, a molded body can be produced by a spun-bond method or a melt-blown method.

In the spun-bond method, melt-spinning is conducted through the use of a multi-hole spinning nozzle by the same method as the string forming method described above in the item (7), web is formed through stretching by using an air sucker disposed under the spinning nozzle, the web is accumulated on a collection surface, and this is press-bonded or heat-fused with an embossing roll and a smoothing roll, so that a nonwoven fabric can be produced. In the melt-blown method, a molten resin discharged from the multi-hole spinning nozzle is brought into contact with a high-speed heated gas blown out of a heated gas outlet, so as to be made into fine fibers, and the resulting fibers are accumulated on a moving support, so that a nonwoven fabric can be produced.

The above-described molded body has a haze of preferably 0.1% to 15%, more preferably 0.1% to 12%, and further preferably 0.1% to 11% at a thickness of 100 μm and a crystallinity of preferably 35% or more, more preferably 38% to 60%, and further preferably 40% to 55%, after a heat treatment at 80° C. to 120° C. for 1 to 300 seconds.

In the present invention, the "crystallinity" is determined on the basis of the differential scanning calorimetry (DSC). Specifically, a non-oriented film produced by press molding is heat-treated in an oven at 105° C. for a predetermined time initially. The film after the heat treatment is weighed by 5 to 6 mg into a pan sealed with nitrogen, putting into a DSC measurement portion, which is sealed with nitrogen and which is set at 30° C. in advance, is conducted, and the temperature is raised to 220° C. at a temperature rising rate of 10° C./min. The crystallization enthalpy ($\Delta Hc$) and the crystal melting enthalpy ($\Delta Hm$) are measured, $[[(\Delta Hm - \Delta Hc)/(\Delta H_0)] \times 100]$ is determined, and this is assumed to be the crystallinity. Here, $\Delta H_0$ represents perfectly ideal crystal melting enthalpy and, for example, the $\Delta H_0$ of polylactic acid is 93 J/g. The "haze" in the present invention is a value measured with a haze meter.

<Uses>

The polylactic acid based resin (A) or the polylactic acid based resin composition according to the present invention can be molded by the above-described various molding methods and can be applied to various uses favorably without being specifically limited. These molded bodies can be applied to various uses, e.g., automobile parts, materials and parts for home appliances, electric and electronic parts, construction materials, civil engineering materials, agricultural materials, daily goods, various films, breathable films and sheets, foamed bodies suitable for general industrial uses and recreational uses, strings and textiles, and medical or sanitary materials. Preferably, the molded bodies can be used for materials and parts for automobiles, materials and parts for home appliances, and electric and electronic materials and parts, which are required to have the heat resistance and the impact resistance.

Specific examples include development in parts, e.g., front doors and wheel caps, to which resin parts have been hitherto applied, as for automobile part and material uses, development in cabinet parts of products, e.g., personal computers, headphone stereos, and cellular phones, as for home appliance material and part uses, and development in reflection material films and sheets and polarizing films and sheets, as for electric and electronic parts.

EXAMPLES

The present invention will be more specifically described below with reference to examples, although the present invention is not specifically limited to these examples.

<Weight Average Molecular Weight>

(I) Weight Average Molecular Weight of Polyolefin Based Compound Serving as Material The value was determined on the basis of comparison with a polystyrene standard sample through gel permeation chromatography (GPC): GPC-150 produced by Millipore Corporation, column: TSKGNHHT 7.5 mm×300 mm, column temperature: 140° C., mobile phase: orthodichlorobenzene (BHT 0.025 percent by weight as antioxidant), and flow rate: 1.0 ml/min.

(II) Weight Average Molecular Weight of Polylactic Acid Based Resin

The value was determined on the basis of comparison with a polystyrene standard sample through gel permeation chromatography (GPC): Shodex GPC-101 produced by SHOWA DENKO K.K., column: "PLgel mixd c" produced by Polymer Labs, Inc.×2 in series, column temperature: 40° C., mobile phase: chloroform, and flow rate: 1 ml/min.

<Crystallization Rate (Isothermal Crystallization Time)>

The value was determined with DSC ("DSC-60" produced by SHIMADZU CORPORATION). A non-oriented film produced by press molding was weighed by 5 to 6 mg into a pan sealed with nitrogen, putting into a DSC measurement portion, which was sealed with nitrogen and which was set at. 30° C. in advance, was conducted. Thereafter, the temperature was raised at a temperature rising rate of 100° C./min, so as to effect melting at 220° C. for 3 minutes. After the melting, cooling was conducted to 100° C. at a cooling rate of 99° C./min. The point in time when cooling to 100° C. was completed was assumed to be a starting time, and the time when an exothermic peak reached a maximum was determined.

<Crystallinity>

The value was determined with DSC ("DSC-60" produced by SHIMADZU CORPORATION). A non-oriented film produced by press molding was heat-treated in an oven at 105° C. for a predetermined time. The film after the heat treatment was weighed by 5 to 6 mg into a pan sealed with nitrogen, putting into a DSC measurement portion, which was sealed with nitrogen and which was set at 25° C. in advance, was conducted. Thereafter, the temperature was raised to 220° C. at a temperature rising rate of 10° C./min. The crystallization enthalpy ($\Delta Hc$) and the crystal melting enthalpy ($\Delta Hm$) were measured, $[[(\Delta Hm - \Delta Hc)/(\Delta H_0)] \times 100]$ was determined, and this was assumed to be the crystallinity. Here, $\Delta H_0$ represents perfectly ideal crystal melting enthalpy and the value of polylactic acid of 93 J/g was used.

<Transparency (Haze (HAZE))>

The value was determined with a haze meter ("NDH2000" produced by NIPPON DENSHOKU INDUSTRIES CO., LTD.) on the basis of JIS K 7105.

Synthesis Example 1

A 1000-ml glass reactor equipped with an agitator, a thermometer, a condenser, and a dropping funnel was charged with 100 g of polyethylene (Mw=2,058, Mn=1,118), which had an epoxy group at an end (89 mmol where Mn=1,118 is assumed) and which was synthesized following Synthesis example 2 of Japanese Unexamined Patent Application Publication No. 2006-131870, and 270 g of toluene, and heat-melting was conducted under reflux of toluene. Thereafter, 30 g (1 mol) of formic acid was added gradually at 90° C., agitation was conducted for 8 hours, and 100 g of warm water was put in so as to separate a water layer. Subsequently, 75 g (KOH 66.8 mmol) of 5% KOH/n-BuOH was added gradually at 90° C., and agitation was conducted at 115° C. for 2 hours. Then, cooling to 80° C. was conducted, acetonitrile was added to precipitate a reaction product, and a solid was taken through filtration. The resulting solid was agitated and washed one time with a methanol aqueous solution and three times with methanol. Next, the resulting solid was taken through filtration and was dried at 60° C. under reduced pressure, so that 98 g of white powder of polyethylene (Mw=2,091, Mn=1,136) having two hydroxyl groups at ends was produced.

Synthesis Example 2

A 1000-ml glass reactor equipped with an agitator, a thermometer, a condenser, and a dropping funnel was charged with 84 g of polyethylene (Mw=2,058, Mn=1,118), which had an epoxy group at an end (75 mmol where Mn=1,118 is assumed) and which was synthesized following Synthesis example 2 of Japanese Unexamined Patent Application Publication No. 2006-131870, 39.4 g (375 mmol) of diethanolamine, and 150 g of toluene, and agitation was conducted for 4 hours under reflux. Thereafter, acetone was added while cooling was conducted, so as to precipitate a reaction product, and a solid was taken through filtration. The resulting solid was agitated and washed one time with an acetone aqueous solution and, furthermore, three times with acetone. Subsequently, the resulting solid was taken through filtration. Then, drying was conducted at room temperature under reduced pressure, so that 82 g of white powder of polyethylene (Mw=1,979, Mn=1,075) having a hydroxyl group and a bis (2-hydroxyethyl)amino group at ends was produced.

Synthesis Example 3

In a manner similar to that in Synthesis example 1 except that the polyethylene having an epoxy group at an end in Synthesis example 1 was changed to an ethylene-propylene copolymer (Mw=1,470, Mn=843), which had an epoxy group at an end and which was synthesized following Synthesis example 8 of Japanese Unexamined Patent Application Publication No. 2006-131870, 94 g of white powder of ethylene-propylene copolymer (Mw=1,503, Mn=862) having two hydroxyl groups at ends was produced.

Synthesis Example 4

In a manner similar to that in Synthesis example 2 except that the polyethylene having an epoxy group at an end in Synthesis example 2 was changed to an ethylene-propylene copolymer (Mw=1,470, Mn=843), which had an epoxy group at an end and which was synthesized following Synthesis example 8 of Japanese Unexamined Patent Application Publication No. 2006-131870, 60.1 g of white powder of ethylene-propylene copolymer (Mw=1,437, Mn=824) having a hydroxyl group and a bis(2-hydroxyethyl)amino group at ends was produced.

Synthesis Example 5

In a manner similar to that in Synthesis example 1 except that the polyethylene having an epoxy group at an end in Synthesis example 1 was changed to 48 g of polyethylene (Mw=7,134, Mn=3,920), which was synthesized following Comparative example 2 of Japanese Unexamined Patent Application Publication No. 2003-73412 and a vinyl group at an end was epoxidized by the same method as in Synthesis example 2 of Japanese Unexamined Patent Application Publication No. 2006-131870, 40 g of white powder of polyethylene (Mw=7,326, Mn=4,025) having two hydroxyl groups at ends was produced.

Synthesis Example 6

In a manner similar to that in Synthesis example 2 except that the polyethylene having an epoxy group at an end in Synthesis example 2 was changed to 55 g of polyethylene (Mw=7,927, Mn=3,920), which was synthesized following Comparative example 2 of Japanese Unexamined Patent Application Publication No. 2003-73412 and a vinyl group at an end was epoxidized by the same method as in Synthesis example 2 of Japanese Unexamined Patent Application Publication No. 2006-131870, 52 g of white powder of polyethylene (Mw=6,940, Mn=3,877) having a hydroxyl group and a bis(2-hydroxyethyl)amino group at ends was produced.

Synthesis Example 7

A 200-mL glass reactor equipped with an agitator, a thermometer, and a condenser was charged with 142.3 g (0.988 mol) of L-lactide, 1.7 g (0.122 mol) of D-lactide, 2.2 g (0.00143 mol) of polyester (hydroxyl equivalent weight: 770 g/eq, weight average molecular weight: 2,810), which had hydroxyl groups at both ends and which was produced by reacting terephthalic acid chloride and 1,4-butanediol, and 11.5 mg of tin octoate, and the temperature was raised to 190° C. in a nitrogen atmosphere while agitation was conducted at the number of revolutions of 150 rpm. Polymerization was effected at 190° C. to 200° C. for 2 hours while the agitation was continued. In the polymerization, as the polymer viscosity increased, the agitation became difficult. Therefore, the number of revolutions was reduced to 50 rpm while monitoring was conducted. The polymerization was terminated after it was ascertained that the viscosity of the polymer increased sufficiently and the molecular weight (Mw) was 203,000 on a GPC basis. At this time, the amount of remaining unreacted lactide was 3.2 percent by weight.

After the polymerization was completed, the polymer was temporally discharged into a bat so as to be cooled and, thereafter, was dissolved into 2,000 mL of chloroform. The resulting chloroform solution was agitated and methanol was added little by little. Since clouding occurred when about 2,000 mL of methanol was added, addition of methanol was suspended, and a polymer was precipitated gradually while agitation was conducted. After 2 hours later, since the polymer was precipitated sufficiently, about 4,000 mL of methanol was further added, agitation was conducted sufficiently for 1 hour, so as to remove remaining lactide. Thereafter, polymer was separated through suction filtration. A filtration residue was rinsed with a small amount of methanol and, furthermore, agitation was conducted for 1 hour in 3,000 mL of methanol. Subsequently, suction filtration was conducted and, thereby, remaining lactide was removed completely. The thus produced polymer was dried at 40° C. for 24 hours in a dryer in a nitrogen stream, so that 135.2 g of polylactic acid (B-1) having a partial structure derived from a polyester produced from terephthalic acid and 1,4-butanediol was produced. The weight average molecular weight (Mw) of the resulting polylactic acid (B-1) was 206,000 and unreacted lactide was not detected.

Synthesis Example 8

The same reactor as that in Synthesis example 7 was used, and in a manner similar to that in Synthesis example 7 except that 2.2 g (0.00143 mol) of polyester (hydroxyl equivalent weight: 770 g/eq), which had hydroxyl groups at both ends and which was produced by reacting terephthalic acid chloride and 1,4-butanediol, was changed to 3.5 g (0.00143 mol) of polyester (hydroxyl equivalent weight: 1,230 g/eq, weight average molecular weight: 4,238), which had hydroxyl groups at both ends and which was produced by reacting terephthalic acid chloride and 1,8-octanediol, 135.8 g of polylactic acid (B-2) having a partial structure derived from a polyester produced from terephthalic acid and 1,8-octanediol was produced. The weight average molecular weight (Mw) of the resulting polylactic acid (B-2) was 217,000.

Synthesis Example 9

The same reactor as that in Synthesis example 7 was used, and in a manner similar to that in Synthesis example 7 except that 2.2 g (0.00143 mol) of polyester (hydroxyl equivalent weight: 770 g/eq), which had hydroxyl groups at both ends and which was produced by reacting terephthalic acid chloride and 1,4-butanediol, was changed to 3.1 g (0.00143 mol in terms of hydroxyl group) of PPG#2000 (Mw=2,200, special grade chemicals, produced by KANTO CHEMICAL CO., INC.), 133.2 g of polylactic acid (B-3) having a partial structure derived from PPG#2000 was produced. The weight average molecular weight (Mw) of the resulting polylactic acid (B-3) was 198,000.

Synthesis Example 10

The same reactor as that in Synthesis example 7 was used, and in a manner similar to that in Synthesis example 7 except that 2.2 g (0.00143 mol) of polyester (hydroxyl equivalent weight: 770 g/eq), which had hydroxyl groups at both ends and which was produced by reacting terephthalic acid chloride and 1,4-butanediol, was changed to a silicone compound (product name: KF-6002, produced by Shin-Etsu Chemical Co., Ltd., hydroxyl equivalent weight: 1,648 g/eq, weight average molecular weight: 6,095): 4.7 g (0.00143 mol), 135.2 g of polylactic acid having a partial structure represented by the following general formula (5) derived from an alkyl-modified silicone compound having hydroxyl groups at both ends was produced. The weight average molecular weight (Mw) of the resulting polylactic acid (B-4) was 209,000.

[Chemical formula 34]

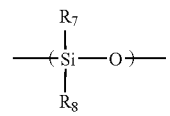

(5)

(In the formula (5), $R_7$ and $R_8$ represent independently a linear or branched alkyl group having the carbon number of 1 to 5 or an aryl group having the carbon number of 6 to 10 and may be the same or different.)

Synthesis Example 11

The same reactor as that in Synthesis example 7 was used, and a reaction was effected in a manner similar to that in Synthesis example 7 except that 2.2 g (0.00143 mol) of polyester (hydroxyl equivalent weight: 770 g/eq), which had hydroxyl groups at both ends and which was produced by reacting terephthalic acid chloride and 1,4-butanediol, was changed to 28.8 g (corresponding to hydroxyl group: 0.0038 mol) of modified polypropylene (Mn=31,000), which was synthesized following Production example 1 of Japanese Unexamined Patent Application Publication No. 2007-177039 and which was grafted with 2-hydroxyethyl methacrylate. However, lactide and the modified polypropylene grafted with 2-hydroxyethyl methacrylate were not compatible with each other and, therefore, the reaction did not proceed.

Synthesis Example 12

In a manner similar to that in Production examples 1 and 3 of Japanese Unexamined Patent Application Publication No. 2007-177039, 4.5 parts by weight of 2-hydroxyethyl methacrylate (HEMA) and 3 parts by weight of t-butylperoxybenzoate (PBZ; produced by NOF CORPORATION) were dry-blended relative to 100 parts by weight of propylene homopolymer powder having a melt flow rate (MFR: 230° C., 2,160 g) of 2.4 g/10 min and a limiting viscosity [η] measured in decalin at 135° C. of 2.6 dl/g with a Henschel mixer and, thereafter, melt-modification was effected at 210° C. by using a twin screw extruder (ZSK-30, TECHNOVEL CORPORATION), so that modified polypropylene resin (hereafter may be referred to as "HEMA-PP") pellets were produced. Regarding the resulting modified polypropylene resin, the weight average molecular weight (Mw) on a GPC basis was 24,000 and the number average molecular weight (Mn) was 9,000.

Furthermore, in a manner similar to that in Production examples 2 and 4 of Japanese Unexamined Patent Application Publication No. 2007-177039, the resulting HEMA-PP was reacted at a ratio of mixed xylene: 360 g, L-lactide: 300 g, and tin octoate serving as a catalyst: 24 mg relative to HEMA-PP: 60 g, so that a copolymer A having a polylactic acid segment and a polypropylene segment was produced at a yield of 330 g. The weight average molecular weight (Mw) of the resulting copolymer A was 289,000.

Example 1

A 200-mL glass reactor equipped with an agitator, a thermometer, and a condenser was charged with 142.3 g (0.988 mol) of L-lactide, 1.7 g (0.122 mol) of D-lactide, polyethylene oligomer, which had two hydroxyl groups at ends and which was produced in Synthesis example 1: 2.05 g (0.0018 mol), and 11.5 mg of tin octoate, and the temperature was raised to 190° C. in a nitrogen atmosphere while agitation was conducted at the number of revolutions of 150 rpm. Polymerization was effected at 190° C. to 200° C. for 2 hours while the agitation was continued. In the polymerization, as the polymer viscosity increased, the agitation became difficult. Therefore, the number of revolutions was reduced to 50 rpm while monitoring was conducted. The polymerization was terminated after it was ascertained that the viscosity of the polymer increased sufficiently and the molecular weight (Mw) was 245,000 on a GPC basis.

After the polymerization was completed, the polymer was temporally discharged into a bat so as to be cooled and, thereafter, was dissolved into 2,000 mL of chloroform. The resulting chloroform solution was agitated and methanol was added little by little. Since clouding occurred when about 2,000 mL of methanol was added, addition of methanol was suspended, and a polymer was precipitated gradually while agitation was conducted. After 2 hours later, since the polymer was precipitated sufficiently, about 4,000 mL of methanol was further added, agitation was conducted sufficiently for 1 hour, so as to remove remaining lactide. Thereafter, polymer was separated through suction filtration. A filtration residue was rinsed with a small amount of methanol and, furthermore, agitation was conducted for 1 hour in 3,000 mL of methanol. Subsequently, suction filtration was conducted and, thereby, remaining lactide was removed completely. The thus produced polymer was dried at 50° C. and 2 kPa for 24 hours, so that 134.2 g of polylactic acid (A-1) having a partial structure (1-1), described below,

[Chemical formula 35]

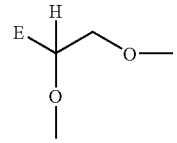

(1-1)

derived from the polyethylene oligomer having two hydroxyl groups at ends was produced. The weight average molecular weight (Mw) of the resulting polylactic acid (A-1) was 251,000.

A group represented by E in this partial structural formula is a polymer residue resulting from ethylene homopolymerization, and the weight average molecular weight (Mw) thereof was 2,015, which was derived by subtracting the molecular weight 42 of an epoxy group and the molecular weight 1 of hydrogen atom corresponding to the substituent Z in the general formula (1) from the weight average molecular weight (Mw) 2,058 of the polymer having an epoxy group at an end in Synthesis example 1.

Furthermore, regarding the polylactic acid, $R_1$ in the general formula (1) is a single bond, and the portion other than the partial structure is formed through repetition of a lactic acid unit.

Example 2

In a manner similar to that in Example 1 except that the polyethylene oligomer, which had two hydroxyl groups at ends and which was produced in Synthesis example 1: 2.05 g (0.0018 mol) was changed to the polyethylene polymer, which had a hydroxyl group and a bis(2-hydroxyethyl)amino group at ends and which was produced in Synthesis example 2: 1.29 g (0.0012 mol), 133.7 g of polylactic acid (A-2) having a partial structure (1'-1), described below,

[Chemical formula 36]

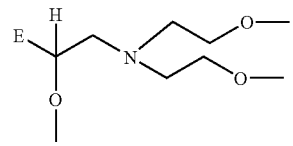

(1'-1)

derived from the polyethylene polymer having a hydroxyl group and a bis(2-hydroxyethyl)amino group at ends was produced. The weight average molecular weight (Mw) of the resulting polylactic acid (A-2) was 248,000.

A group represented by E in this partial structural formula is a polymer residue resulting from ethylene homopolymerization, and the weight average molecular weight (Mw) thereof was 2,015, which was derived by subtracting the molecular weight 42 of an epoxy group and the molecular weight 1 of hydrogen atom corresponding to the substituent Z in the general formula (1') from the weight average molecular weight (Mw) 2,058 of the polymer having an epoxy group at an end in Synthesis example 2.

Furthermore, regarding the polylactic acid, $R_2$ and $R_3$ in the general formula (1') are an oxyethylene group, and the portion other than the partial structure is formed through repetition of a lactic acid unit.

Example 3

In a manner similar to that in Example 1 except that the polyethylene oligomer, which had two hydroxyl groups at ends and which was produced in Synthesis example 1: 2.05 g (0.0018 mol) was changed to the ethylene-propylene copolymer, which had two hydroxyl groups at ends and which was produced in Synthesis example 3: 1.55 g (0.0018 mol), 128.2 g of polylactic acid (A-3) having the above-described partial structure (1-1) derived from the ethylene-propylene copolymer having two hydroxyl groups at ends was produced. The weight average molecular weight (Mw) of the resulting polylactic acid (A-3) was 227,000.

A group represented by E in this partial structural formula is a polymer residue resulting from ethylene-propylene copolymerization, and the weight average molecular weight (Mw) thereof was 1,427 or 1,413, which was derived by subtracting the molecular weight 42 of an epoxy group and the molecular weight 1 of hydrogen atom or the molecular weight 15 of methyl group corresponding to the substituent Z in the general formula (1) from the weight average molecular weight (Mw) 1,470 of the polymer having an epoxy group at an end in Synthesis example 3.

Furthermore, regarding the polylactic acid, $R_1$ in the general formula (1) is a single bond, and the portion other than the partial structure is formed through repetition of a lactic acid unit.

Example 4

In a manner similar to that in Example 1 except that the polyethylene oligomer, which had two hydroxyl groups at ends and which was produced in Synthesis example 1: 2.05 g (0.0018 mol) was changed to the ethylene-propylene copolymer, which had a hydroxyl group and a bis(2-hydroxyethyl)amino group at ends and which was produced in Synthesis example 4: 0.99 g (0.0012 mol), 125.7 g of polylactic acid (A-4) having the above-described partial structure (1'-1) derived from the ethylene-propylene copolymer having a hydroxyl group and a bis(2-hydroxyethyl)amino group at ends was produced. The weight average molecular weight (Mw) of the resulting polylactic acid (A-4) was 271,000.

A group represented by E in this partial structural formula is a polymer residue resulting from ethylene-propylene copolymerization, and the weight average molecular weight (Mw) thereof was 1,427 or 1,413, which was derived by subtracting the molecular weight 42 of an epoxy group and the molecular weight 1 of hydrogen atom or the molecular weight 15 of methyl group corresponding to the substituent Z in the general formula (1') from the weight average molecular weight (Mw) 1,470 of the polymer having an epoxy group at an end in Synthesis example 4.

Furthermore, regarding the polylactic acid, $R_2$ and $R_3$ in the general formula (1') are an oxyethylene group, and the portion other than the partial structure is formed through repetition of a lactic acid unit.

Example 5

In a manner similar to that in Example 1 except that the polyethylene oligomer, which had two hydroxyl groups at ends and which was produced in Synthesis example 1: 2.05 g (0.0018 mol) was changed to the polyethylene, which had two hydroxyl groups at ends and which was produced in Synthesis example 5: 7.25 g (0.0018 mol), 138.1 g of polylactic acid (A-5) having the above-described partial structure (1-1) derived from the polyethylene having two hydroxyl groups at ends was produced. The weight average molecular weight (Mw) of the resulting polylactic acid (A-5) was 284,000.

A group represented by E in this partial structural formula is a polymer residue resulting from ethylene homopolymerization, and the weight average molecular weight (Mw) thereof was 7,091, which was derived by subtracting the molecular weight 42 of an epoxy group and the molecular weight 1 of hydrogen atom corresponding to the substituent Z in the general formula (1) from the weight average molecular weight (Mw) 7,134 of the polymer having an epoxy group at an end in Synthesis example 5.

Furthermore, regarding the polylactic acid, $R_1$ in the general formula (1) is a single bond, and the portion other than the partial structure is formed through repetition of a lactic acid unit.

Example 6

In a manner similar to that in Example 1 except that the polyethylene oligomer, which had two hydroxyl groups at ends and which was produced in Synthesis example 1: 2.05 g (0.0018 mol) was changed to the polyethylene, which had a hydroxyl group and a bis(2-hydroxyethyl)amino group at ends and which was produced in Synthesis example 6: 4.65 g (0.0012 mol), 131.8 g of polylactic acid (A-6) having the above-described partial structure (1'-1) derived from the polyethylene having a hydroxyl group and a bis(2-hydroxyethyl)amino group at ends was produced. The weight average molecular weight (Mw) of the resulting polylactic acid (A-6) was 256,000.

A group represented by E in this partial structural formula is a polymer residue resulting from ethylene homopolymerization, and the weight average molecular weight (Mw) thereof was 7,884, which was derived by subtracting the molecular weight 42 of an epoxy group and the molecular weight 1 of hydrogen atom corresponding to the substituent Z in the general formula (1') from the weight average molecular weight (Mw) 7,927 of the polymer having an epoxy group at an end in Synthesis example 6.

Furthermore, regarding the polylactic acid, $R_2$ and $R_3$ in the general formula (1') are an oxyethylene group, and the portion other than the partial structure is formed through repetition of a lactic acid unit.

Examples 7 to 12

The polylactic acids (A-1) to (A-6) synthesized in Examples 1 to 6 and the transparent nucleator (C) in parts by weight shown in Table 1 were kneaded by using Labo Plastomill under the condition of a temperature of 200° C., a time of 5 minutes, and the number of revolutions of 50 rpm. The resulting kneaded product was pressed for 5 minutes under the condition of 200° C. and 10 MPa, so as to produce a film having a thickness of 100 μm. The isothermal crystallization time of the resulting film was measured as described above. Furthermore, the resulting film was put in an oven at 105° C. for 20 seconds or 60 seconds so as to conduct anneal (heat treatment), and the crystallinity and the transparency (haze) before and after anneal were measured as described above. The results are shown in Table 1.

Examples 13 to 22

The polylactic acids (A-1) to (A-6) synthesized in Examples 1 to 6, the transparent nucleator (C), commercially available polylactic acid (B-0) [registered trade mark LACEA, Grade H-100, produced by Mitsui Chemicals, Inc.], and the polylactic acid based resins (B-1) to (B-4), which had specific structures and which were synthesized in Synthesis examples 7 to 10, in parts by weight shown in Table 1 were kneaded by using Labo Plastomill under the condition of a temperature of 200° C., a time of 5 minutes, and the number of revolutions of 50 rpm. The resulting kneaded product was pressed for 5 minutes under the condition of 200° C. and 10 MPa, so as to produce a film having a thickness of 100 μm. The isothermal crystallization time of the resulting film was measured as described above. Furthermore, the resulting film was put in an oven at 105° C. for 20 seconds or 60 seconds so as to conduct anneal (heat treatment), and the crystallinity and the transparency (haze) before and after anneal were measured as described above. The results are shown in Tables 1 and 2.

Comparative Example 1

In a manner similar to that in Example 1 except that a commercially available polylactic acid (B-0) [registered trade mark LACEA, Grade H-100, produced by Mitsui Chemicals, Inc.] and the transparent nucleator (C) in parts by weight shown in Table 1 were kneaded, a film was produced, and the isothermal crystallization time, the crystallinity, and the transparency were measured. The results are shown in Table 2.

Comparative Example 2

The copolymer (copolymer A: weight average molecular weight (289,000)), which was synthesized in Synthesis example 12 and which had a polylactic acid segment and a polypropylene segment was used, a film was produced in a manner similar to that in Example 1, and the isothermal crystallization time, the crystallinity, and the transparency were measured. The results are shown in Table 3.

Comparative Example 3

A film was produced in a manner similar to that in Example 1 except that the transparent nucleator (C) was added to the copolymer (copolymer A: weight average molecular weight (289,000)) having a polylactic acid segment and a polypropylene segment in Comparative example 2 and kneading was conducted in parts by weight shown in Table 1, and the isothermal crystallization time, the crystallinity, and the transparency were measured. The results are shown in Table 3.

TABLE 1

| | Composition | | | | | | Isothermal crystallization time (min) | Crystallinity (%) Anneal time (sec) | | | Haze (%) Anneal time (sec) | | |
|---|---|---|---|---|---|---|---|---|---|---|---|---|---|
| | Polylactic acid (A) | | Polylactic acid (B) | | Transparent nucleator (C) | | | | | | | | |
| | Type | Parts by weight | Type | Parts by weight | Type | Parts by weight | | 0 | 20 | 60 | 0 | 20 | 60 |
| Example 7 | A-1 | 100 | — | — | EBL | 0.5 | 1.1 | 14.6 | 24.0 | 42.8 | 0.85 | 1.30 | 6.28 |
| Example 8 | A-2 | 100 | — | — | EBL | 0.5 | 1.2 | 13.8 | 25.8 | 43.0 | 1.02 | 1.24 | 6.16 |
| Example 9 | A-3 | 100 | — | — | EBL | 0.5 | 0.9 | 14.0 | 23.1 | 41.9 | 0.94 | 1.20 | 6.20 |
| Example 10 | A-4 | 100 | — | — | EBL | 0.5 | 0.9 | 12.5 | 25.1 | 43.2 | 0.87 | 1.18 | 5.80 |
| Example 11 | A-5 | 100 | — | — | EBL | 0.5 | 1.0 | 15.3 | 27.9 | 44.7 | 0.89 | 1.20 | 6.37 |
| Example 12 | A-6 | 100 | — | — | EBL | 0.5 | 0.9 | 10.7 | 20.3 | 42.2 | 0.91 | 1.21 | 6.05 |
| Example 13 | A-1 | 50 | B-0 | 50 | EBL | 0.5 | 0.7 | 14.8 | 23.8 | 43.8 | 0.45 | 1.06 | 4.75 |
| Example 14 | A-2 | 50 | B-0 | 50 | EBL | 0.5 | 0.9 | 13.5 | 21.6 | 43.2 | 0.54 | 1.23 | 4.22 |
| Example 15 | A-3 | 90 | B-0 | 10 | EBL | 0.5 | 0.6 | 11.9 | 23.9 | 43.7 | 0.89 | 1.15 | 4.97 |
| Example 16 | A-4 | 75 | B-0 | 25 | EBL | 0.5 | 0.9 | 15.7 | 21.6 | 42.6 | 0.91 | 1.28 | 4.25 |
| Example 17 | A-5 | 30 | B-0 | 70 | EBL | 0.5 | 0.7 | 12.7 | 23.0 | 43.0 | 0.45 | 1.16 | 4.75 |
| Example 18 | A-6 | 10 | B-0 | 90 | EBL | 0.5 | 0.9 | 14.0 | 21.6 | 43.2 | 0.54 | 1.23 | 4.22 |

EBL: ethylenebislauric acid amide

TABLE 2

| | Composition | | | | | | Isothermal crystallization time (min) | Crystallinity (%) Anneal time (sec) | | | Haze (%) Anneal time (sec) | | |
|---|---|---|---|---|---|---|---|---|---|---|---|---|---|
| | Polylactic acid (A) | | Polylactic acid (B) | | Transparent nucleator (C) | | | | | | | | |
| | Type | Parts by weight | Type | Parts by weight | Type | Parts by weight | | 0 | 20 | 60 | 0 | 20 | 60 |
| Example 19 | A-1 | 50 | B-1 | 50 | EBL | 0.5 | 0.9 | 12.6 | 23.1 | 41.8 | 0.75 | 1.10 | 3.20 |
| Example 20 | A-2 | 50 | B-2 | 50 | EBL | 0.5 | 0.8 | 11.4 | 21.8 | 41.0 | 1.62 | 1.12 | 3.18 |
| Example 21 | A-1 | 50 | B-3 | 50 | EBL | 0.5 | 0.9 | 11.2 | 21.1 | 42.2 | 0.73 | 1.07 | 3.25 |

TABLE 2-continued

| | Composition | | | | | | | Crystallinity (%) | | | Haze (%) | | |
|---|---|---|---|---|---|---|---|---|---|---|---|---|---|
| | Polylactic acid (A) | | Polylactic acid (B) | | Transparent nucleator (C) | | Isothermal crystallization | Anneal time (sec) | | | Anneal time (sec) | | |
| | Type | Parts by weight | Type | Parts by weight | Type | Parts by weight | time (min) | 0 | 20 | 60 | 0 | 20 | 60 |
| Example 22 | A-2 | 50 | B-4 | 50 | EBL | 0.5 | 0.7 | 10.5 | 20.7 | 42.1 | 0.67 | 1.08 | 3.42 |
| Comparative example 1 | — | — | B-0 | 100 | EBL | 0.5 | 1.5 | 4.5 | 5.11 | 35.6 | 0.7 | 4.01 | 57.7 |

EBL: ethylenebislauric acid amide

TABLE 3

| | Composition | | | | Crystallinity (%) Anneal time (sec) | | | Haze (%) Anneal time (sec) | | |
|---|---|---|---|---|---|---|---|---|---|---|
| | Copolymer (A) Parts by weight | Transparent nucleator (C) Type | Parts by weight | Isothermal crystallization time (min) | 0 | 20 | 60 | 0 | 20 | 60 |
| Comparative example 2 | 100 | EBL | — | 2.6 | 6.4 | 9.8 | 23.6 | 12.2 | 14.1 | 18.8 |
| Comparative example 3 | 100 | EBL | 0.5 | 1.1 | 10.4 | 18.8 | 32.3 | 13.8 | 26.7 | 42.5 |

EBL: ethylenebislauric acid amide

The invention claimed is:

1. A polylactic acid based resin (A) comprising a weight average molecular weight (Mw) of 5,000 to 1,000,000 and a moiety represented by the following formula (1):

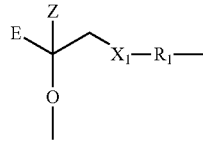

(1)

wherein E represents a polymer residue, which is formed from an ethylene homopolymer, a copolymer of ethylene and an α-olefin having the carbon number of 3 to 20, or a homopolymer of an α-olefin having the carbon number of 3 to 20 and which has a weight average molecular weight (Mw) of 400 to 20,000, Z represents a H atom, an alkyl group, or an aralkyl group, $X_1$ represents an O atom or a S atom, and $R_1$ represents a single bond or a group represented by the following formula (2):

$$-R_4-X_2-$$  (2)

wherein $R_4$ represents a divalent hydrocarbon group or a polyoxyalkylene group and $X_2$ represents an O atom, a S atom, or an NH group;

or the following formula (1'):

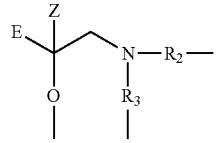

(1')

wherein E represents a polymer residue, which is formed from an ethylene homopolymer, a copolymer of ethylene and an α-olefin having the carbon number of 3 to 20, or a homopolymer of an α-olefin having the carbon number of 3 to 20 and which has a weight average molecular weight (Mw) of 400 to 20,000, Z represents a H atom, an alkyl group, or an aralkyl group, and $R_2$ and $R_3$ represent independently a single bond or a group represented by the above formula (2).

2. The polylactic acid based resin (A) according to claim 1, comprising a moiety represented by the formula (1) or (1') described in claim 1 and a weight average molecular weight (Mw) of 5,000 to 1,000,000, wherein a moiety other than the moiety represented by the formula (1) or (1') is formed through repetition of a lactic acid unit (where in the formula (1), E represents a polymer residue, which is formed from an ethylene homopolymer or a copolymer of ethylene and an α-olefin having the carbon number of 3 to 10 and which has a weight average molecular weight (Mw) of 400 to 20,000, Z represents a H atom,
$X_1$ represents an O atom, and $R_1$ represents a single bond or an oxyalkylene group having the carbon number of 1 to 6, and in the formula (1'), E represents a polymer residue, which is formed from an ethylene homopolymer or a copolymer of ethylene and an α-olefin having the carbon number of 3 to 10 and which has a weight average molecular weight (Mw) of 400 to 20,000, Z represents a H atom, and $R_2$ and $R_3$ represent a single bond or an oxyalkylene group having the carbon number of 1 to 6).

3. A polylactic acid based resin composition comprising 5 to 95 percent by weight of polylactic acid based resin (A) according to claim 1.

4. A polylactic acid based resin composition comprising 5 to 95 parts by weight of polylactic acid based resin (A) according to claim 1 and 95 to 5 parts by weight of polylactic acid based resin (B) other than the polylactic acid based resin (A) (where a total of the polylactic acid based resins (A) and (B) is assumed to be 100 parts by weight).

5. The polylactic acid based resin composition according to claim 4, wherein the polylactic acid based resin (B) is a polylactic acid.

6. The polylactic acid based resin composition according to claim 4, wherein the polylactic acid based resin (B) comprises a moiety represented by the following general formula (3):

$$—X_3—R_5—X_4— \quad (3)$$

wherein $X_3$ and $X_4$ represent independently an O atom, a S atom, or an NH group, $R_5$ represents a divalent hydrocarbon group containing at least one aromatic ring or aliphatic ring, and the hydrocarbon group may contain an O atom, a N atom, or a S atom, and the weight average molecular weight (Mw) of the polylactic acid based resin (B) is within the range of 5,000 to 1,000,000.

7. The polylactic acid based resin composition according to claim 4, wherein the polylactic acid based resin (B) comprises a moiety represented by the following general formula (4):

$$—X_3—R_6—X_4— \quad (4)$$

wherein $X_3$ and $X_4$ represent independently an O atom, a S atom, or an NH group, $R_6$ represents a divalent aliphatic hydrocarbon group containing no ring structure and having a weight average molecular weight (Mw) of 25 to 50,000, and the hydrocarbon group may contain an O atom, a N atom, or a S atom, and the weight average molecular weight (Mw) of the polylactic acid based resin (B) is within the range of 5,000 to 1,000,000.

8. The polylactic acid based resin composition according to claim 4, wherein the polylactic acid based resin (B) comprises a moiety which is formed from a repetition unit represented by the following general formula (5):

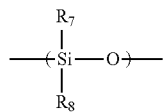

(5)

wherein $R_7$ and $R_8$ represent independently a linear or branched alkyl group having the carbon number of 1 to 5 or an aryl group having the carbon number of 6 to 10 and may be the same or different,
and which has a weight average molecular weight (Mw) within the range of 100 to 10,000, and the weight average molecular weight (Mw) of the polylactic acid based resin (B) is within the range of 5,000 to 1,000,000.

9. A polylactic acid based resin composition wherein 0.1 to 10 parts by weight of at least one type of transparent nucleator (C) selected from carboxylic acid amides, aliphatic alcohols, and aliphatic carboxylic acid esters is further contained relative to 100 parts by weight of polylactic acid based resin (A) according to claim 1.

10. The polylactic acid based resin composition according to claim 4, wherein 0.1 to 10 parts by weight of at least one type of transparent nucleator (C) selected from carboxylic acid amides, aliphatic alcohols, and aliphatic carboxylic acid esters is further contained
relative to 100 parts by weight of polylactic acid based resins (A) and (B) in total.

11. The polylactic acid based resin composition according to claim 9, wherein the transparent nucleator (C) is at least one type of carboxylic acid amide selected from the group consisting of lauric acid amide, palmitic acid amide, stearic acid amide, erucic acid amide, behenic acid amide, ricinoleic acid amide, hydroxystearic acid amide, N-oleylpalmitic acid amide, N-stearylerucic acid amide, ethylenebiscapric acid amide, ethylenebislauric acid amide, ethylenebisstearic acid amide, ethylenebisoleic acid amide, ethylenebis-1,2-hydroxystearic acid amide, hexamethylenebiscapric acid amide, hexamethylenebislauric acid amide, hexamethylenebisstearic acid amide, hexamethylenebisoleic acid amide, hexamethylenebis-1,2-hydroxystearic acid amide, m-xylylenebiscapric acid amide, m-xylylenebislauric acid amide, m-xylylenebisstearic acid amide, m-xylylenebisoleic acid amide, and m-xylylenebis-1,2-hydroxystearic acid amide.

12. The polylactic acid based resin composition according to claim 10, wherein the transparent nucleator (C) is at least one type of carboxylic acid amide selected from the group consisting of lauric acid amide, palmitic acid amide, stearic acid amide, erucic acid amide, behenic acid amide, ricinoleic acid amide, hydroxystearic acid amide, N-oleylpalmitic acid amide, N-stearylerucic acid amide, ethylenebiscapric acid amide, ethylenebislauric acid amide, ethylenebisstearic acid amide, ethylenebisoleic acid amide, ethylenebis-1,2-hydroxystearic acid amide, hexamethylenebiscapric acid amide, hexamethylenebislauric acid amide, hexamethylenebisstearic acid amide, hexamethylenebisoleic acid amide, hexamethylenebis-1,2-hydroxystearic acid amide, m-xylylenebiscapric acid amide, m-xylylenebislauric acid amide, m-xylylenebisstearic acid amide, m-xylylenebisoleic acid amide, and m-xylylenebis-1,2-hydroxystearic acid amide.

13. A molded body comprising the polylactic acid based resin (A) according to claim 1 and having a haze of 0.1% to 15% at a thickness of 100 μm and a crystallinity of 35% or more after anneal (heat treatment) at 105° C. for 60 seconds.

14. A molded body comprising the polylactic acid based resin composition according to claim 3 and having a haze of 0.1% to 15% at a thickness of 100 μm and a crystallinity of 35% or more after anneal (heat treatment) at 105° C. for 60 seconds.

15. A molded body comprising the polylactic acid based resin composition according to claim 4 and having a haze of 0.1% to 15% at a thickness of 100 μm and a crystallinity of 35% or more after anneal (heat treatment) at 105° C. for 60 seconds.

16. A molded body comprising the polylactic acid based resin composition according to claim 9 and having a haze of 0.1% to 15% at a thickness of 100 μm and a crystallinity of 35% or more after anneal (heat treatment) at 105° C. for 60 seconds.

17. A molded body comprising the polylactic acid based resin composition according to claim 10 and having a haze of 0.1% to 15% at a thickness of 100 μm and a crystallinity of 35% or more after anneal (heat treatment) at 105° C. for 60 seconds.

18. A method for producing the polylactic acid based resin (A) according to claim 1, the method comprising the step of copolymerizing a polymer represented by formula (I) or (II) and lactide and/or lactic acid, wherein formula (I) is represented by the structure:

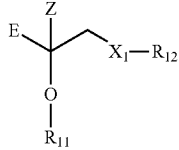

wherein E represents a polymer residue, which is formed from an ethylene homopolymer, a copolymer of ethylene and an α-olefin having the carbon number of 3 to 20, or a homopolymer of an α-olefin having the carbon number of 3 to 20 and which has a weight average molecular weight (Mw) of 400 to 20,000, Z represents a H atom, an alkyl group, or an aralkyl group, $X_1$ represents an O atom or a S atom, and $R_{11}$ and $R_{12}$ represent independently a H atom, a hydroxyalkyl group having the carbon number of 1 to 10, or a hydroxypolyoxyalkylene group having a weight average molecular weight (relative to standard polystyrene) of 200 to 6,000, and wherein formula (II) is represented by the structure:

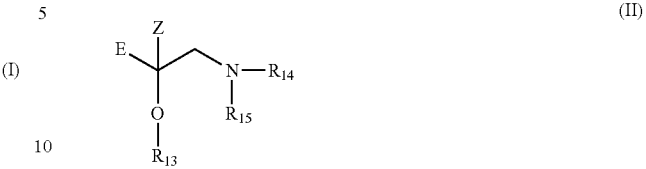

wherein E represents a polymer residue, which is formed from an ethylene homopolymer, a copolymer of ethylene and an α-olefin having the carbon number of 3 to 20, or a homopolymer of an α-olefin having the carbon number of 3 to 20 and which has a weight average molecular weight (Mw) of 400 to 20,000, Z represents a H atom, an alkyl group, or an aralkyl group, and $R_{13}$ to $R_{15}$ represent independently a H atom, a hydroxyalkyl group having the carbon number of 1 to 10, or a hydroxypolyoxyalkylene group having a weight average molecular weight (relative to standard polystyrene) of 200 to 6,000.

* * * * *